(12) United States Patent
Huang et al.

(10) Patent No.: US 10,142,832 B2
(45) Date of Patent: Nov. 27, 2018

(54) INFORMATION SENDING AND PROCESSING METHOD AND APPARATUS

(71) Applicant: Huawei Technologies Co., Ltd., Shenzhen (CN)

(72) Inventors: Jiejing Huang, Shenzhen (CN); Huangwei Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/519,905

(22) PCT Filed: Nov. 5, 2014

(86) PCT No.: PCT/CN2014/090333
§ 371 (c)(1),
(2) Date: Apr. 18, 2017

(87) PCT Pub. No.: WO2016/070356
PCT Pub. Date: May 12, 2016

(65) Prior Publication Data
US 2017/0257757 A1   Sep. 7, 2017

(51) Int. Cl.
H04W 12/02 (2009.01)
H04W 68/02 (2009.01)
H04W 60/04 (2009.01)
H04W 88/06 (2009.01)

(52) U.S. Cl.
CPC .......... *H04W 12/02* (2013.01); *H04W 60/04* (2013.01); *H04W 68/02* (2013.01); *H04W 88/06* (2013.01)

(58) Field of Classification Search
CPC .................................................. H04W 12/02

USPC ................................................. 455/410–413
See application file for complete search history.

(56) References Cited

U.S. PATENT DOCUMENTS

| 8,965,345 B2 * | 2/2015 | Oh ...................... H04L 12/6418 455/412.2 |
| 2005/0255882 A1 | 11/2005 | Tsao |
| 2010/0146253 A1 * | 6/2010 | Kawamoto ............. A63F 13/49 713/1 |

(Continued)

FOREIGN PATENT DOCUMENTS

| CN | 103037312 A | 4/2013 |
| CN | 103270524 A | 8/2013 |

(Continued)

OTHER PUBLICATIONS

Machine Translation and Abstract of Chinese Publication No. CN103037312, dated Apr. 10, 2013, 24 pages.

(Continued)

*Primary Examiner* — Michael T Vu
(74) *Attorney, Agent, or Firm* — Conley Rose, P.C.

(57) ABSTRACT

An information sending and processing method and an apparatus in the field of mobile communications technologies is provided. In the method, when a mobile terminal switches between operation modes, a token used in an original operation mode is temporarily suspended, and a notification message related to the original token is also temporarily stored and not sent to the mobile terminal. A user who uses the mobile terminal in an operation mode that is different than the original operation mode does not receive a message in the original operation mode.

18 Claims, 9 Drawing Sheets

(56) References Cited

U.S. PATENT DOCUMENTS

2014/0207916 A1    7/2014  Li et al.
2014/0289320 A1    9/2014  Fan et al.
2016/0371688 A1   12/2016  Hammad

FOREIGN PATENT DOCUMENTS

| CN | 103404113 A | 11/2013 |
| CN | 103905617 A | 7/2014 |
| CN | 104125063 A | 10/2014 |
| WO | 2014176808 A1 | 11/2014 |

OTHER PUBLICATIONS

Foreign Communication From a Counterpart Application, European Application No. 14905422.3, Extended European Search Report dated Sep. 29, 2017, 8 pages.
Machine Translation and Abstract of Chinese Publication No. CN103905617, dated Jul. 2, 2014, 18 pages.
Foreign Communication From a Counterpart Application, PCT Application No. PCT/CN2014/090333, English Translation of International Search Report dated Jun. 29, 2015, 2 pages.
Foreign Communication From a Counterpart Application, PCT Application No. PCT/CN2014/090333, English Translation of Written Opinion dated Jun. 29, 2015, 7 pages.

\* cited by examiner

INFORMATION SENDING AND PROCESSING METHOD AND APPARATUS

CROSS-REFERENCE TO RELATED APPLICATIONS

This application is a national stage application of International Patent Application No. PCT/CN2014/090333, filed on Nov. 5, 2014, which is hereby incorporated by reference in its entirety.

TECHNICAL FIELD

The present disclosure relates to the field of communications technologies, and in particular, to an information sending and processing method and an apparatus.

BACKGROUND

In the prior art, a mobile terminal such as a mobile phone may support multiple modes and multiple containers. For example, in addition to a common user mode, the mobile terminal may support a guest mode, a bring your own device (BYOD) office or enterprise mode, or the like. Therefore, notification messages in different contextual modes should be distinguished. For example, when the mobile phone is in the guest mode, a related notification message in the common user mode should be hidden to protect privacy of an owner of the mobile phone. For another example, when the mobile phone is in the office or enterprise mode, an enterprise notification message is not shown on a screen of the common user mode for a purpose of suppressing enterprise information from the common user mode.

In the prior art, for notification messages in different contextual modes of a mobile phone, it is generally considered to hide a contact at a privacy level or a notification message including a sensitive source. Although such a practice can ensure, to some extent, that privacy information of a user is not disclosed, the user generally needs to manually operate such a setting, which is relatively cumbersome. Alternatively, if a sensitive source is filtered, a terminal may perform filtering. However, a deviation may occur during filtering by the terminal, and consequently, a filtering effect is not quite good, which is prone to cause disclosure of user privacy data.

It may be learned that in the prior art, for messages in different operation modes, a suppressing effect between the different operation modes is not quite good, which is likely to cause disclosure of user privacy and relatively poor information security.

SUMMARY

Embodiments of the present disclosure provide an information sending method, an information processing method, and an apparatus, so as to resolve a technical prior-art problem of poor information suppressing between different operation modes of a mobile phone.

According to a first aspect of the present disclosure, an information sending method is provided, and executed by a mobile terminal, where the mobile terminal has at least a first operation mode and a second operation mode, the first operation mode is different from the second operation mode. The method includes receiving, when the mobile terminal is in the first operation mode, at least one first notification message that is related to a first token and sent by a push server, where the first token is a first identification that is of the mobile terminal in the first operation mode and that is used for a push service. The method also includes sending a first instruction message to the push server when the mobile terminal switches from the first operation mode to the second operation mode, where the first instruction message is used to instruct the push server to temporarily store at least one second notification message related to the first token; and receiving at least one third notification message that is related to a second token and sent by the push server, where the second token is a second identification that is of the mobile terminal in the second operation mode and that is used for a push service.

With reference to the first aspect, in a first possible implementation manner of the first aspect, before receiving at least one first notification message that is related to a first token and sent by a push server, the method further includes sending a first registration request to the push server, where the first registration request is used to request the push server to generate the first token, and the first token is used for the push service of the mobile terminal in the first operation mode; and receiving the first token sent by the push server.

With reference to the first possible implementation manner of the first aspect, in a second possible implementation manner of the first aspect, after receiving the first token sent by the push server, the method further includes sending the first token to an application server, where the first token is used by the application server to send at least one first notification message and at least one second notification message to the push server according to the first token.

With reference to the first aspect, the first possible implementation manner, or the second possible implementation manner of the first aspect, in a third possible implementation manner of the first aspect, after sending a first instruction message to the push server, the method further includes sending a second registration request to the push server, where the second registration request is used to request the push server to generate the second token, and the second token is used for the push service of the mobile terminal in the second operation mode; receiving and saving the second token sent by the push server; and sending the second token to an application server, where the second token is used by the application server to send at least one third notification message to the push server according to the second token.

With reference to the third possible implementation manner of the first aspect, in a fourth possible implementation manner of the first aspect, after receiving and saving the second token sent by the push server, the method further includes destroying the second token when the mobile terminal exits the second operation mode.

With reference to the third possible implementation manner or the fourth possible implementation manner of the first aspect, in a fifth possible implementation manner of the first aspect, after receiving and saving the second token sent by the push server, the method further includes sending a second instruction message to the push server and to the application server when the mobile terminal exits the second operation mode, where the second instruction message is used to instruct the push server to destroy the second token.

With reference to the third possible implementation manner or the fourth possible implementation manner of the first aspect, in a sixth possible implementation manner of the first aspect, after receiving and saving the second token sent by the push server, the method further includes sending a second instruction message to the application server when the mobile terminal exits the second operation mode, where the second instruction message is used to instruct the application server to destroy the second token.

With reference to the first aspect, the first possible implementation manner, the second possible implementation manner, or the third possible implementation manner of the first aspect, in a seventh possible implementation manner of the first aspect, after receiving and saving the second token sent by the push server, the method further includes sending a third instruction message to the push server when the mobile terminal exits the second operation mode, where the third instruction message is used to instruct the push server to temporarily store the second token.

With reference to the seventh possible implementation manner of the first aspect, in an eighth possible implementation manner of the first aspect, temporarily storing the second token includes temporarily storing at least one fourth notification message related to the second token, and after a fourth instruction message is received, sending the temporarily stored at least one fourth notification message to the mobile terminal, where the fourth instruction message is sent by the mobile terminal, and the fourth instruction message is used to instruct to activate the second token.

With reference to the first aspect, the first possible implementation manner, the second possible implementation manner, the third possible implementation manner, the seventh possible implementation manner, or the eighth possible implementation manner of the first aspect, in a ninth possible implementation manner of the first aspect, after receiving and saving the second token sent by the push server, the method further includes sending the third instruction message to the application server when the mobile terminal exits the second operation mode, where the third instruction message is used to instruct the application server to temporarily store the second token.

With reference to the ninth possible implementation manner of the first aspect, in a tenth possible implementation manner of the first aspect, temporarily storing the second token includes temporarily storing at least one fourth notification message related to the second token, and after the fourth instruction message is received, sending the temporarily stored at least one fourth notification message to the push server, where the fourth instruction message is used to instruct to activate the second token.

According to a second aspect of the present disclosure, an information processing method is provided, and executed by a server, including receiving a first instruction message sent by a mobile terminal, where the first instruction message is used to instruct the server to temporarily store at least one second notification message related to a first token, and the first token is a first identification of the mobile terminal in the first operation mode and that is used for a push service; and temporarily storing at least one second notification message according to the first instruction message.

With reference to the second aspect, in a first possible implementation manner of the second aspect, before receiving a first instruction message sent by a mobile terminal, the method further includes sending at least one first notification message related to the first token to the mobile terminal.

With reference to the first possible implementation manner of the second aspect, in a second possible implementation manner of the second aspect, if the server is a push server, before sending at least one first notification message related to the first token to the mobile terminal, the method further includes receiving a first registration request sent by the mobile terminal, where the first registration request is used to request the push server to generate the first token, and the first token is used for the push service of the mobile terminal in the first operation mode, where the mobile terminal has at least the first operation mode and a second operation mode; and generating, according to the first registration request, the first token that is of the mobile terminal in the first operation mode and that is used for the push service, and sending the first token to the mobile terminal.

With reference to the second possible implementation manner of the second aspect, in a third possible implementation manner of the second aspect, after receiving a first instruction message sent by a mobile terminal, the method further includes receiving a second registration request sent by the mobile terminal, where the second registration request is used to request the push server to generate a second token, and the second token is used for a push service of the mobile terminal in the second operation mode; and generating, according to the second registration request, the second token that is of the mobile terminal in the second operation mode and that is used for the push service, and sending the second token to the mobile terminal.

With reference to the third possible implementation manner of the second aspect, in a fourth possible implementation manner of the second aspect, after sending the second token to the mobile terminal, the method further includes sending at least one third notification message related to the second token to the mobile terminal, where the second token is a second identification that is of the mobile terminal in the second operation mode and that is used for the push service.

With reference to the third possible implementation manner or the fourth possible implementation manner of the second aspect, in a fifth possible implementation manner of the second aspect, after sending the second token to the mobile terminal, the method further includes receiving a second instruction message sent by the mobile terminal, where the second instruction message is used to instruct the push server to destroy the second token and to activate the first token; and destroying the second token and activating the first token, according to the second instruction message.

With reference to the fifth possible implementation manner of the second aspect, in a sixth possible implementation manner of the second aspect, after destroying the second token and activating the first token, according to the second instruction message, the method further includes sending the temporarily stored at least one second notification message to the mobile terminal.

With reference to the third possible implementation manner or the fourth possible implementation manner of the second aspect, in a seventh possible implementation manner of the second aspect, after sending the second token to the mobile terminal, the method further includes receiving a third instruction message sent by the mobile terminal, where the third instruction message is used to instruct the push server to temporarily store the second token and to activate the first token; and temporarily storing the second token and activating the first token, according to the third instruction message.

With reference to the seventh possible implementation manner of the second aspect, in an eighth possible implementation manner of the second aspect, temporarily storing the second token includes temporarily storing at least one fourth notification message related to the second token, and after a fourth instruction message is received, sending the temporarily stored at least one fourth notification message to the mobile terminal, where the fourth instruction message is sent by the mobile terminal, and the fourth instruction message is used to instruct to activate the second token.

With reference to the seventh possible implementation manner or the eighth possible implementation manner of the second aspect, in a ninth possible implementation manner of the second aspect, after temporarily storing the second token and activating the first token, according to the third instruction message, the method further includes sending the temporarily stored at least one second notification message to the mobile terminal.

With reference to the second aspect or the first possible implementation manner of the second aspect, in a tenth possible implementation manner of the second aspect, if the server is an application server, after receiving a first instruction message sent by a mobile terminal, the method further includes receiving a second token sent by the mobile terminal, where the second token is a second identification that is of the mobile terminal in the second operation mode and that is used for a push service.

With reference to the tenth possible implementation manner of the second aspect, in an eleventh possible implementation manner of the second aspect, after receiving a second token sent by the mobile terminal, the method further includes sending at least one third notification message related to the second token to a push server.

With reference to the tenth possible implementation manner or the eleventh possible implementation manner of the second aspect, in a twelfth possible implementation manner of the second aspect, after receiving a second token sent by the mobile terminal, the method further includes receiving a second instruction message sent by the mobile terminal, where the second instruction message is used to instruct the application server to destroy the second token and to activate the first token; and destroying the second token and activating the first token, according to the second instruction message.

With reference to the twelfth possible implementation manner of the second aspect, in a thirteenth possible implementation manner of the second aspect, after destroying the second token and activating the first token, according to the second instruction message, the method further includes sending the temporarily stored at least one second notification message to the push server.

With reference to the tenth possible implementation manner or the eleventh possible implementation manner of the second aspect, in a fourteenth possible implementation manner of the second aspect, after receiving a second token sent by the mobile terminal, the method further includes receiving a third instruction message sent by the mobile terminal, where the third instruction message is used to instruct the application server to temporarily store the second token and to activate the first token; and temporarily storing the second token and activating the first token, according to the third instruction message.

With reference to the fourteenth possible implementation manner of the second aspect, in a fifteenth possible implementation manner of the second aspect, temporarily storing the second token includes temporarily storing at least one fourth notification message related to the second token, and after a fourth instruction message is received, sending the temporarily stored at least one fourth notification message to the push server, where the fourth instruction message is used to instruct to activate the second token.

With reference to the fourteenth possible implementation manner or the fifteenth possible implementation manner of the second aspect, in a sixteenth possible implementation manner of the second aspect, after temporarily storing the second token and activating the first token, according to the third instruction message, the method further includes: sending the temporarily stored at least one second notification message to the push server.

According to a third aspect of the present disclosure, a mobile terminal is provided, and has at least a first operation mode and a second operation mode, where the first operation mode is different from the second operation mode. The mobile terminal includes a receiving module configured to receive, when the mobile terminal is in the first operation mode, at least one first notification message that is related to a first token and sent by a push server, where the first token is a first identification that is of the mobile terminal in the first operation mode and that is used for a push service; and a sending module configured to send a first instruction message to the push server when the mobile terminal switches from the first operation mode to the second operation mode, where the first instruction message is used to instruct the push server to temporarily store at least one second notification message related to the first token, where the receiving module is further configured to receive at least one third notification message that is related to a second token and sent by the push server, where the second token is a second identification that is of the mobile terminal in the second operation mode and that is used for a push service.

With reference to the third aspect, in a first possible implementation manner of the third aspect, the sending module is further configured to send a first registration request to the push server before at least one first notification message that is related to the first token and sent by the push server is received, where the first registration request is used to request the push server to generate the first token, and the first token is used for the push service of the mobile terminal in the first operation mode; and the receiving module is further configured to receive the first token sent by the push server.

With reference to the first possible implementation manner of the third aspect, in a second possible implementation manner of the third aspect, the sending module is further configured to send, after the receiving module receives the first token sent by the push server, the first token to an application server, where the first token is used by the application server to send at least one first notification message and at least one second notification message to the push server according to the first token.

With reference to the third aspect, the first possible implementation manner of the third aspect, or the second possible implementation manner of the third aspect, in a third possible implementation manner of the third aspect, the sending module is further configured to send, after sending the first instruction message to the push server, a second registration request to the push server, where the second registration request is used to request the push server to generate the second token, and the second token is used for the push service of the mobile terminal in the second operation mode; the receiving module is further configured to receive and save the second token sent by the push server; and the sending module is further configured to send the second token to an application server, where the second token is used by the application server to send at least one third notification message to the push server according to the second token.

With reference to the third possible implementation manner of the third aspect, in a fourth possible implementation manner of the third aspect, the mobile terminal further includes a destruction module configured to, after the receiving module receives and saves the second token sent by the push server, destroy the second token when the mobile terminal exits the second operation mode.

With reference to the third possible implementation manner or the fourth possible implementation manner of the third aspect, in a fifth possible implementation manner of the third aspect, the sending module is further configured to send, after the receiving module receives and saves the second token sent by the push server, a second instruction message to the push server when the mobile terminal exits the second operation mode, where the second instruction message is used to instruct the push server to destroy the second token.

With reference to the third possible implementation manner or the fourth possible implementation manner of the third aspect, in a sixth possible implementation manner of the third aspect, the sending module is further configured to send, after the receiving module receives and saves the second token sent by the push server, a second instruction message to the application server when the mobile terminal exits the second operation mode, where the second instruction message is used to instruct the application server to destroy the second token.

With reference to the third aspect, the first possible implementation manner, the second possible implementation manner, or the third possible implementation manner of the third aspect, in a seventh possible implementation manner of the third aspect, the sending module is further configured to send, after the receiving module receives and saves the second token sent by the push server, a third instruction message to the push server when the mobile terminal exits the second operation mode, where the third instruction message is used to instruct the push server to temporarily store the second token.

With reference to the seventh possible implementation manner of the third aspect, in an eighth possible implementation manner of the third aspect, that the second token is temporarily stored includes at least one fourth notification message related to the second token is temporarily stored, and after a fourth instruction message is received, the temporarily stored at least one fourth notification message is sent to the mobile terminal, where the fourth instruction message is sent by the mobile terminal, and the fourth instruction message is used to instruct to activate the second token.

With reference to the third aspect, the first possible implementation manner, the second possible implementation manner, the third possible implementation manner, the seventh possible implementation manner, or the eighth possible implementation manner of the third aspect, in a ninth possible implementation manner of the third aspect, the sending module is further configured to send, after the receiving module receives and saves the second token sent by the push server, the third instruction message to the application server when the mobile terminal exits the second operation mode, where the third instruction message is used to instruct the application server to temporarily store the second token.

With reference to the ninth possible implementation manner of the third aspect, in a tenth possible implementation manner of the third aspect, that the second token is temporarily stored includes the at least one fourth notification message related to the second token is temporarily stored, and after the fourth instruction message is received, the temporarily stored at least one fourth notification message is sent to the push server, where the fourth instruction message is used to instruct to activate the second token.

According to a fourth aspect of the present disclosure, a server is provided, that includes a receiving module configured to receive a first instruction message sent by a mobile terminal, where the first instruction message is used to instruct the server to temporarily store at least one second notification message related to a first token, and the first token is a first identification that is of the mobile terminal in the first operation mode and that is used for a push service; and an operation module configured to temporarily store at least one second notification message according to the first instruction message.

With reference to the fourth aspect, in a first possible implementation manner of the fourth aspect, the server further includes a sending module configured to send, before the receiving module receives the first instruction message sent by the mobile terminal, at least one first notification message related to the first token to the mobile terminal.

With reference to the first possible implementation manner of the fourth aspect, in a second possible implementation manner of the fourth aspect, if the server is a push server, the push server further includes a processing module. The receiving module is configured to receive, before the sending module sends at least one first notification message related to the first token to the mobile terminal, a first registration request sent by the mobile terminal, where the first registration request is used to request the push server to generate the first token, and the first token is used for the push service of the mobile terminal in the first operation mode, where the mobile terminal has at least the first operation mode and a second operation mode. The processing module is configured to generate the first token according to the first registration request, and send the first token to the mobile terminal by using the sending module.

With reference to the second possible implementation manner of the fourth aspect, in a third possible implementation manner of the fourth aspect, the receiving module is further configured to receive, after receiving the first instruction message sent by the mobile terminal, a second registration request sent by the mobile terminal, where the second registration request is used to request the push server to generate a second token, and the second token is used for a push service of the mobile terminal in the second operation mode. The processing module is configured to generate the second token according to the second registration request, and send the second token to the mobile terminal by using the sending module.

With reference to the third possible implementation manner of the fourth aspect, in a fourth possible implementation manner of the fourth aspect, the sending module is further configured to send, after sending the second token to the mobile terminal, at least one third notification message related to the second token to the mobile terminal, where the second token is a second identification that is of the mobile terminal in the second operation mode and that is used for the push service.

With reference to the third possible implementation manner or the fourth possible implementation manner of the fourth aspect, in a fifth possible implementation manner of the fourth aspect, the receiving module is further configured to receive, after the sending module sends the second token to the mobile terminal, a second instruction message sent by the mobile terminal, where the second instruction message is used to instruct the push server to destroy the second token and to activate the first token. The processing module is configured to destroy the second token and activate the first token according to the second instruction message.

With reference to the fifth possible implementation manner of the fourth aspect, in a sixth possible implementation manner of the fourth aspect, the sending module is further configured to send the temporarily stored at least one second notification message to the mobile terminal after the processing module destroys the second token and activates the first token, according to the second instruction message.

With reference to the third possible implementation manner or the fourth possible implementation manner of the fourth aspect, in a seventh possible implementation manner of the fourth aspect, the receiving module is further configured to, after the sending module sends the second token to the mobile terminal, receive a third instruction message sent by the mobile terminal, where the third instruction message is used to instruct the push server to temporarily store the second token and to activate the first token. The processing module is further configured to temporarily store the second token and activate the first token according to the third instruction message.

With reference to the seventh possible implementation manner of the fourth aspect, in an eighth possible implementation manner of the fourth aspect, the processing module is further configured to temporarily store the second token by temporarily storing at least one fourth notification message related to the second token, and after a fourth instruction message is received, sending the temporarily stored at least one fourth notification message to the mobile terminal by using the sending module, where the fourth instruction message is sent by the mobile terminal, and the fourth instruction message is used to instruct to activate the second token.

With reference to the seventh possible implementation manner or the seventh possible implementation manner of the fourth aspect, in a ninth possible implementation manner of the fourth aspect, the sending module is further configured to send the temporarily stored at least one second notification message to the mobile terminal after the processing module temporarily stores the second token and activates the first token, according to the third instruction message.

With reference to the fourth aspect or the first possible implementation manner of the fourth aspect, in a tenth possible implementation manner of the fourth aspect, if the server is an application server, the receiving module is further configured to receive, after receiving the first instruction message sent by the mobile terminal, a second token sent by the mobile terminal, where the second token is a second identification that is of the mobile terminal in the second operation mode and that is used for a push service.

With reference to the tenth possible implementation manner of the fourth aspect, in an eleventh possible implementation manner of the fourth aspect, the sending module is further configured to send, after the receiving module receives the second token sent by the mobile terminal, at least one third notification message related to the second token to a push server.

With reference to the tenth possible implementation manner or the eleventh possible implementation manner of the fourth aspect, in a twelfth possible implementation manner of the fourth aspect, the application server further includes a processing module. The receiving module is further configured to receive, after receiving the second token sent by the mobile terminal, a second instruction message sent by the mobile terminal, where the second instruction message is used to instruct the push server to destroy the second token and to activate the first token. The processing module is configured to destroy the second token and activate the first token according to the second instruction message.

With reference to the twelfth possible implementation manner of the fourth aspect, in a thirteenth possible implementation manner of the fourth aspect, the sending module is further configured to send the temporarily stored at least one second notification message to the push server after the processing module destroys the second token and activates the first token, according to the second instruction message.

With reference to the tenth possible implementation manner or the eleventh possible implementation manner of the fourth aspect, in a fourteenth possible implementation manner of the fourth aspect, the application server further includes a processing module. The receiving module is further configured to receive, after receiving the second token sent by the mobile terminal, a third instruction message sent by the mobile terminal, where the third instruction message is used to instruct the application server to temporarily store the second token and to activate the first token. The processing module is configured to temporarily store the second token and activate the first token according to the third instruction message.

With reference to the fourteenth possible implementation manner of the fourth aspect, in a fifteenth possible implementation manner of the fourth aspect, the server further includes the sending module. The processing module is configured to temporarily store the second token by temporarily storing at least one fourth notification message related to the second token, and after a fourth instruction message is received, sending the temporarily stored at least one fourth notification message to the push server by using the sending module. The fourth instruction message is used to instruct to activate the second token.

With reference to the fourteenth possible implementation manner or the fifteenth possible implementation manner of the fourth aspect, in a sixteenth possible implementation manner of the fourth aspect, the sending module is further configured to send the temporarily stored at least one second notification message to the push server after the processing module temporarily stores the second token and activates the first token according to the third instruction message.

According to a fifth aspect of the present disclosure, a mobile terminal is provided, and has at least a first operation mode and a second operation mode, where the first operation mode is different from the second operation mode, and the mobile terminal includes a communications unit, an input unit, and an output unit that are connected to a same processor unit. The communications unit is configured to establish a first communication channel with a push server. The input unit is configured to receive, when the mobile terminal is in the first operation mode, with the first communication channel at least one first notification message that is related to a first token and sent by the push server, where the first token is a first identification of the mobile terminal in the first operation mode and that is used for a push service. The output unit is configured to send, by using the first communication channel, a first instruction message to the push server when the mobile terminal switches from the first operation mode to the second operation mode, where the first instruction message is used to instruct the push server to temporarily store at least one second notification message related to the first token. The input unit is further configured to receive, by using the first communication channel, at least one third notification message that is related to a second token and sent by the push server, where the second token is a second identification that is of the mobile terminal in the second operation mode and that is used for a push service.

With reference to the fifth aspect, in a first possible implementation manner of the fifth aspect, the output unit is further configured to send, by using the first communication channel, a first registration request to the push server before the input unit receives, by using the first communication channel, the at least one first notification message that is related to the first token and sent by the push server, where the first registration request is used to request the push server to generate the first token, and the first token is used for the push service of the mobile terminal in the first operation mode. The input unit is further configured to receive, by using the first communication channel, the first token sent by the push server.

With reference to the first possible implementation manner of the fifth aspect, in a second possible implementation manner of the fifth aspect, the output unit is further configured to send, after the input unit receives with the first communication channel the first token sent by the push server, the first token to an application server by using the first communication channel, where the first token is used by the application server to send at least one first notification message and at least one second notification message to the push server according to the first token.

With reference to the fifth aspect, the first possible implementation manner of the fifth aspect, or the second possible implementation manner of the fifth aspect, in a third possible implementation manner of the fifth aspect, the output unit is further configured to send, after sending the first instruction message to the push server by using the first communication channel, a second registration request to the push server by using the first communication channel, where the second registration request is used to request the push server to generate the second token, and the second token is used for the push service of the mobile terminal in the second operation mode. The input unit is further configured to receive and save, by using the first communication channel, the second token sent by the push server, The output unit is further configured to send the second token to an application server by using the first communication channel, where the second token is used by the application server to send the at least one third notification message to the push server according to the second token.

With reference to the third possible implementation manner of the fifth aspect, in a fourth possible implementation manner of the fifth aspect, the processor unit is configured to destroy, after the input unit receives and saves by using the first communication channel the second token sent by the push server, the second token when the mobile terminal exits the second operation mode.

With reference to the third possible implementation manner or the fourth possible implementation manner of the fifth aspect, in a fifth possible implementation manner of the fifth aspect, the output unit is further configured to send, after the input unit receives and saves by using the first communication channel the second token sent by the push server, by using the first communication channel a second instruction message to the push server when the mobile terminal exits the second operation mode, where the second instruction message is used to instruct the push server to destroy the second token.

With reference to the third possible implementation manner or the fourth possible implementation manner of the fifth aspect, in a sixth possible implementation manner of the fifth aspect, the output unit is further configured to send, after the input unit receives and saves by using the first communication channel the second token sent by the push server, by using the first communication channel a second instruction message to the application server when the mobile terminal exits the second operation mode, where the second instruction message is used to instruct the application server to destroy the second token.

With reference to the fifth aspect, the first possible implementation manner, the second possible implementation manner, or the third possible implementation manner of the fifth aspect, in a seventh possible implementation manner of the fifth aspect, the output unit is further configured to send, after the input unit receives and saves by using the first communication channel the second token sent by the push server, by using the first communication channel a third instruction message to the push server when the mobile terminal exits the second operation mode, where the third instruction message is used to instruct the push server to temporarily store the second token.

With reference to the seventh possible implementation manner of the fifth aspect, in an eighth possible implementation manner of the fifth aspect, the second token is temporarily stored by temporarily storing at least one fourth notification message related to the second token, and after a fourth instruction message is received, the temporarily stored at least one fourth notification message is sent to the mobile terminal, where the fourth instruction message is sent by the mobile terminal, and the fourth instruction message is used to instruct to activate the second token.

With reference to the fifth aspect, the first possible implementation manner, the second possible implementation manner, the third possible implementation manner, the seventh possible implementation manner, or the eighth possible implementation manner of the fifth aspect, in a ninth possible implementation manner of the fifth aspect, the output unit is further configured to send, after the input unit receives and saves by using the first communication channel the second token sent by the push server, with the first communication channel the third instruction message to the application server when the mobile terminal exits the second operation mode, where the third instruction message is used to instruct the application server to temporarily store the second token.

With reference to the ninth possible implementation manner of the fifth aspect, in a tenth possible implementation manner of the fifth aspect, the second token is temporarily stored by temporarily storing at least one fourth notification message related to the second token, and after the fourth instruction message is received, the temporarily stored at least one fourth notification message is sent to the push server, where the fourth instruction message is used to instruct to activate the second token.

According to a sixth aspect of the present disclosure, a server is provided, including an input unit and a communications unit that are connected to a same processor unit, where the communications unit is configured to establish a second communication channel with a mobile terminal. The input unit is configured to receive, by using the second communication channel, a first instruction message sent by the mobile terminal, where the first instruction message is used to instruct the server to temporarily store at least one second notification message related to a first token, and the first token is a first identification of the mobile terminal in the first operation mode and that is used for a push service. The processor unit is configured to temporarily store at least one second notification message according to the first instruction message.

With reference to the sixth aspect, in a first possible implementation manner of the sixth aspect, the server further includes an output unit, which is connected to the processor unit, and is configured to send, before the input unit receives by using the second communication channel the first instruction message sent by the mobile terminal, at least one first notification message related to the first token to the mobile terminal by using the second communication channel.

With reference to the first possible implementation manner of the sixth aspect, in a second possible implementation manner of the sixth aspect, if the server is a push server, the input unit is further configured to receive, before the output unit sends the at least one first notification message related to the first token to the mobile terminal by using the second communication channel, by using the second communication channel a first registration request sent by the mobile terminal, where the first registration request is used to request the push server to generate the first token, and the first token is used for the push service of the mobile terminal in the first operation mode, where the mobile terminal has at least the first operation mode and a second operation mode. The processor unit is further configured to generate the first token according to the first registration request and send the first token to the mobile terminal by using the output unit and with the second communication channel.

With reference to the second possible implementation manner of the sixth aspect, in a third possible implementation manner of the sixth aspect, the input unit is further configured to receive, after the input unit receives with the second communication channel the first instruction message sent by the mobile terminal, a second registration request sent by the mobile terminal, where the second registration request is used to request the push server to generate a second token, and the second token is used for a push service of the mobile terminal in the second operation mode. The processor unit is further configured to generate the second token according to the second registration request and send the second token to the mobile terminal by using the output unit and with the second communication channel.

With reference to the third possible implementation manner of the sixth aspect, in a fourth possible implementation manner of the sixth aspect, the output unit is further configured to send, after sending the second token to the mobile terminal by using the second communication channel, at least one third notification message related to the second token to the mobile terminal by using the second communication channel, where the second token is a second identification that is of the mobile terminal in the second operation mode and that is used for the push service.

With reference to the third possible implementation manner or the fourth possible implementation manner of the sixth aspect, in a fifth possible implementation manner of the sixth aspect, the input unit is further configured to receive, after the output unit sends the second token to the mobile terminal by using the second communication channel, with the second communication channel a second instruction message sent by the mobile terminal, where the second instruction message is used to instruct the push server to destroy the second token and to activate the first token. The processor unit is further configured to destroy the second token and activate the first token according to the second instruction message.

With reference to the fifth possible implementation manner of the sixth aspect, in a sixth possible implementation manner of the sixth aspect, the output unit is further configured to send, by using the second communication channel, the temporarily stored at least one second notification message to the mobile terminal after the processor unit destroys the second token and activates the first token, according to the second instruction message.

With reference to the third possible implementation manner or the fourth possible implementation manner of the sixth aspect, in a seventh possible implementation manner of the sixth aspect, the input unit is further configured to receive, after the output unit sends the second token to the mobile terminal by using the second communication channel, with the second communication channel a third instruction message sent by the mobile terminal, where the third instruction message is used to instruct the push server to temporarily store the second token and to activate the first token. The processor unit is further configured to temporarily store the second token and activate the first token according to the third instruction message.

With reference to the seventh possible implementation manner of the sixth aspect, in an eighth possible implementation manner of the sixth aspect, the processor unit is further configured to temporarily store the second token by temporarily storing at least one fourth notification message related to the second token, and after a fourth instruction message is received, sending the temporarily stored at least one fourth notification message to the mobile terminal by using the output unit and by using the second communication channel. The fourth instruction message is sent by the mobile terminal and the fourth instruction message is used to instruct to activate the second token.

With reference to the seventh possible implementation manner or the eighth possible implementation manner of the sixth aspect, in a ninth possible implementation manner of the sixth aspect, the output unit is further configured to send, by using the second communication channel, the temporarily stored at least one second notification message to the mobile terminal after the processor unit temporarily stores the second token and activates the first token according to the third instruction message.

With reference to the sixth aspect or the first possible implementation manner of the sixth aspect, in a tenth possible implementation manner of the sixth aspect, if the server is an application server, the input unit is further configured to receive, after receiving with the second communication channel the first instruction message sent by the mobile terminal, with the second communication channel a second token sent by the mobile terminal, where the second token is a second identification that is of the mobile terminal in the second operation mode and that is used for a push service.

With reference to the tenth possible implementation manner of the sixth aspect, in an eleventh possible implementation manner of the sixth aspect, the output unit is further configured to send, after the second token sent by the mobile terminal is received by using the second communication channel, at least one third notification message related to the second token to a push server by using the second communication channel.

With reference to the tenth possible implementation manner or the eleventh possible implementation manner of the sixth aspect, in a twelfth possible implementation manner of the sixth aspect, the input unit is further configured to receive, after receiving with the second communication channel the second token sent by the mobile terminal, with the second communication channel a second instruction message sent by the mobile terminal, where the second instruction message is used to instruct the push server to destroy the second token and to activate the first token. The processor unit is further configured to destroy the second token and activate the first token according to the second instruction message.

With reference to the twelfth possible implementation manner of the sixth aspect, in a thirteenth possible implementation manner of the sixth aspect, the output unit is further configured to send, by using the second communication channel, the temporarily stored at least one second notification message to the push server after the processor unit destroys the second token and activates the first token according to the second instruction message.

With reference to the ninth possible implementation manner or the tenth possible implementation manner of the sixth aspect, in a fourteenth possible implementation manner of the sixth aspect, the input unit is further configured to receive, after receiving with the second communication channel the second token sent by the mobile terminal, with the second communication channel a third instruction message sent by the mobile terminal, where the third instruction message is used to instruct the application server to temporarily store the second token and to activate the first token. The processor unit is further configured to temporarily store the second token and activate the first token according to the third instruction message.

With reference to the fourteenth possible implementation manner of the sixth aspect, in a fifteenth possible implementation manner of the sixth aspect, the processor unit is further configured to temporarily store the second token by temporarily storing at least one fourth notification message related to the second token, and when a fourth instruction message is received by using the input unit, sending the temporarily stored at least one fourth notification message to the push server by using the output unit and by using the second communication channel, where the fourth instruction message is used to instruct to activate the second token.

With reference to the fourteenth possible implementation manner or the fifteenth possible implementation manner of the sixth aspect, in a sixteenth possible implementation manner of the sixth aspect, the output unit is further configured to send, by using the second communication channel, the temporarily stored at least one second notification message to the push server after the processor unit temporarily stores the second token and activates the first token according to the third instruction message.

In the embodiments of the present disclosure, when the mobile terminal is in the first operation mode, the push server sends a notification message related to the first token, that is, sends the at least one first notification message to the mobile terminal. If the mobile terminal switches to the second operation mode, and the push server may still receive a notification message that is related to the first token and referred to as the at least one second notification message herein, the mobile terminal instructs the push server to stop sending the at least one second notification message. In addition, the mobile terminal may further apply for the second token that is in the second operation mode so as to receive, in the second operation mode, a notification message related to the second token, that is, receive the at least one third notification message. In this way, when being in different operation modes, the mobile terminal may be corresponding to different tokens, so that the mobile terminal can receive different notification messages according to the different operation modes. It may be learned that after the technical solutions in the embodiments of the present disclosure are used, for messages in different operation modes, a suppressing effect between the different operation modes is relatively good. For example, if the first operation mode is an owner mode, and the second operation mode is a guest mode, in the second operation mode, the mobile terminal no longer receives a notification message related to the first operation mode, which avoids disclosure of user privacy to the greatest extent, improves information security, and also improves system reliability.

DESCRIPTION OF EMBODIMENTS

Figure 1:
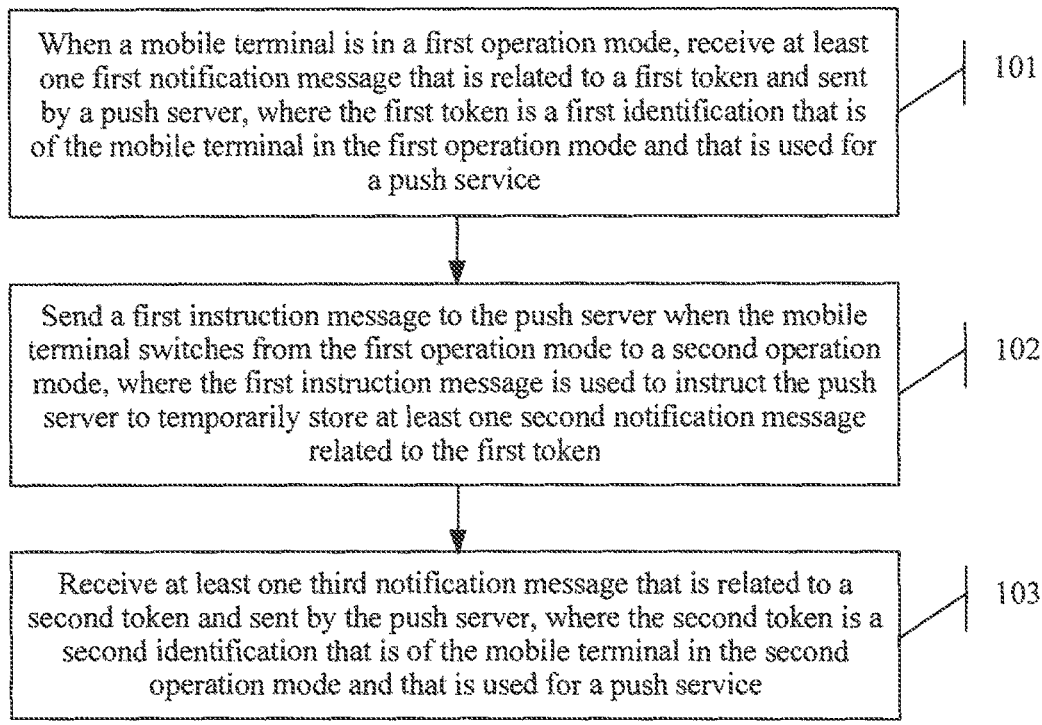
FIG. 1 is a main flowchart of an information sending method according to an embodiment of the present disclosure.

Embodiments of the present disclosure provide an information sending method that is executed by a mobile terminal. The mobile terminal has at least a first operation mode and a second operation mode, and the first operation mode is different from the second operation mode. The method includes receiving, when the mobile terminal is in the first operation mode, at least one first notification message that is related to a first token and sent by a push server, where the first token is a first identification that is of the mobile terminal in the first operation mode and that is used for a push service; sending a first instruction message to the push server when the mobile terminal switches from the first operation mode to the second operation mode, where the first instruction message is used to instruct the push server to temporarily store at least one second notification message related to the first token; and receiving at least one third notification message that is related to a second token and sent by the push server, where the second token is a second identification that is of the mobile terminal in the second operation mode and that is used for a push service.

In the embodiments of the present disclosure, when the mobile terminal is in the first operation mode, the push server sends a notification message related to the first token, that is, send the at least one first notification message, to the mobile terminal. If the mobile terminal switches to the second operation mode, and the push server may still receive a notification message that is related to the first token and referred to as the at least one second notification message herein, the mobile terminal instructs the push server to stop sending the at least one second notification message. In addition, the mobile terminal may further apply for the second token that is in the second operation mode, so as to receive, in the second operation mode, a notification message related to the second token, that is, receive the at least one third notification message. In this way, when being in different operation modes, the mobile terminal may be corresponding to different tokens, so that the mobile terminal can receive different notification messages according to the different operation modes. It may be learned that after the technical solutions in the embodiments of the present disclosure are used, for messages in different operation modes, a suppressing effect between the different operation modes is relatively good. For example, if the first operation mode is an owner mode, and the second operation mode is a guest mode, in the second operation mode, the mobile terminal no longer receives a notification message related to the first operation mode, which avoids disclosure of user privacy to the greatest extent, improves information security and also improves system reliability.

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" are often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects unless otherwise noted.

In the prior art, push services of mobile terminals such as mobile phones have respective push mechanisms according to different operation platforms. However, existing mainstream smartphone operating systems, for example, operating systems such as an iOS, a Windows® Phone operating system (WP OS), and an Android operating system (Android OS) have similar push mechanisms: A message on an application server is pushed to a corresponding mobile terminal by using a push server. In each push mechanism, there is a token (or referred to as an identifier) for uniquely identifying a mobile terminal. For example, in the iOS (previously known as iPhone® OS), the identifier is a device token; in the WP OS, the identification is a uniform resource identifier (URI); and in the Android OS, the identification is a registration identifier (registration ID).

In the embodiments of the present disclosure, a token is used to identify a mobile terminal in a push service, and the token may also be referred to as an identifier. It should be noted that an identity of the mobile terminal is indicated by a terminal identifier (mobile terminal ID), and the token is used to identify the mobile terminal only in the push service. That is, in the push service, different mobile terminals may be corresponding to different tokens. In addition, according to the technical solutions in the embodiments of the present disclosure, one mobile terminal may be corresponding to multiple tokens; however, one token identifies one operation mode of the mobile terminal and different operation modes are corresponding to different tokens.

The following further describes the embodiments of the present disclosure in detail with reference to the accompanying drawings of this specification.

Referring to FIG. 1, an embodiment of the present disclosure provides an information sending method. The method is executed by a mobile terminal. The mobile terminal has at least a first operation mode and a second operation mode, and the first operation mode is different from the second operation mode. A main procedure of the method is described as follows.

Step 101: When the mobile terminal is in the first operation mode, receive at least one first notification message that is related to a first token and sent by a push server, where the first token is a first identification of the mobile terminal in the first operation mode and that is used for a push service.

Optionally, in this embodiment of the present disclosure, before at least one first notification message related to the first token and sent by the push server is received, the method may further include sending a first registration request to the push server, where the first registration request is used to request the push server to generate the first token, and the first token is used for the push service of the mobile terminal in the first operation mode; and receiving the first token sent by the push server.

In an example, when the mobile terminal is in the first operation mode, a first application installed in the mobile terminal determines to receive notification information, that is, to receive a push service, which may be that when the application is installed. The first application receives a prompt message that indicates whether to receive a notification message, and if a user chooses to receive the notification message, the first application determines to receive the notification message. Alternatively, after the first application is installed, if a user considers that the first application needs to receive a notification message, the user may choose to receive the notification message. In this case, the first application sends the first registration request to the push server by using the mobile terminal, to request the push server to generate an identification that is of the mobile terminal in the first operation mode and that is used for the push service, where the identification is referred to as the first identification herein, that is, to request the push server to generate the first token. The first application may be any application, in the mobile terminal, that is installed in the first operation mode and that can receive a notification message. After the push server receives the first registration request, if previously, the push server does not generate a token corresponding to the first operation mode of the mobile terminal, the push server may generate the first token according to the first registration request and a mobile terminal ID, and send the first token to the mobile terminal, which includes sending the first token to the first application by using the mobile terminal. If the push server has previously generated the first token corresponding to the first operation mode of the mobile terminal, that is, if the push server has previously received the first registration request that is sent, when the mobile terminal is in the first operation mode, by a third application by using the mobile terminal, the push server may directly send the generated first token to the mobile terminal, which includes sending the first token to the first application by using the mobile terminal.

The push server receives many notification messages. Because the push server may be corresponding to multiple mobile terminals, the push server distinguishes between different mobile terminals according to tokens. For example, the push server receives a notification message 1. If it is determined that a token corresponding to the notification message 1 is the first token, the push server sends the notification message 1 to the mobile terminal.

That is, if the push server receives the at least one first notification message related to the first token, the push server sends the at least one first notification message to the mobile terminal.

Further, in an embodiment of the present disclosure, after the first token sent by the push server is received, the method may further include: sending the first token to an application server, where the first token is used by the application server to send the at least one first notification message and the at least one second notification message to the push server according to the first token.

A notification message received by the push server is sent by the application server to the push server. Therefore, after the mobile terminal receives the first token, the first application needs to send the first token to the application server by using the mobile terminal. After receiving the first token, the application server may send notification messages related to the first token to the push server according to the first token, so that the push server can send the notification messages to the mobile terminal.

Content of the second notification message is described in step 102.

Step 102: Send a first instruction message to the push server when the mobile terminal switches from the first operation mode to the second operation mode, where the first instruction message is used to instruct the push server to temporarily store at least one second notification message related to the first token.

In this embodiment of the present disclosure, the second operation mode may be a guest mode or an office mode or the like.

When the mobile terminal switches to the second operation mode, the push server may be instructed to temporarily store the notification message related to the first token, so that when being in the second operation mode, the mobile terminal no longer receives the notification message that is in the first operation mode. Particularly, when the second operation mode is a guest mode, a guest does not receive a notification message that should be received by an owner, thereby protecting privacy security of a user to the greatest extent.

In addition, although both the first notification message and the second notification message are notification messages related to the first token, receiving times are different. The first notification message is received when the mobile terminal uses the first token, and the second notification message is received when the mobile terminal stops using the first token. Therefore, for distinguishing messages, the notification messages are respectively referred to as the first notification message and the second notification message.

Optionally, in this embodiment of the present disclosure, after the first instruction message is sent to the push server, the method may further include sending a second registration request to the push server, where the second registration request is used to request the push server to generate a second token, and the second token is used for a push service of the mobile terminal in the second operation mode; receiving and saving the second token sent by the push server; and sending the second token to the application server, where the second token is used by the application server to send the at least one third notification message to the push server according to the second token.

Because the first operation mode is different from the second operation mode, applications installed in the two operation modes may also be different.

When the mobile terminal switches to the second operation mode, a second application installed in the mobile terminal determines to receive push information, which may be that when the application is installed. The second application receives a prompt message that indicates whether to receive a notification message, and if a user chooses to receive the notification message, the second application determines to receive the notification message. Alternatively, after the second application is installed, if a user considers that the second application needs to receive a notification message, the user may choose to receive the notification message. In this case, the second application sends the second registration request to the push server by using the mobile terminal, to request the push server to generate an identification of the mobile terminal in the second operation mode and that is used for the push service, to request the push server to generate the second token. The identification is referred to as a second identification herein. After the push server receives the second registration request, if previously the push server does not generate a token corresponding to the second operation mode of the mobile terminal, the push server may generate the second token according to the second registration request and the mobile terminal ID, and send the second token to the mobile terminal, which includes sending the second token to the second application by using the mobile terminal. If the push server has previously generated the second token corresponding to the second operation mode of the mobile terminal, that is, if the push server has previously received the second registration request that is sent, when the mobile terminal is in the second operation mode, by a fourth application by using the mobile terminal, the push server may directly send the generated second token to the mobile terminal, which includes sending the second token to the second application by using the mobile terminal.

The second application may be any application, in the mobile terminal, that is installed in the second operation mode and that can receive a notification message. The first application and the second application may be a same application, or may be different applications. If the first application and the second application are a same application, received notification messages may be different because tokens corresponding to the two applications in the two operation modes are different.

The push server generates a token according to the mobile terminal ID regardless of whether the token is the first token or the second token. However, although a token is generated according to the mobile terminal ID, tokens generated each time may be different. In this case, it is ensured that the first token is different from the second token.

The second application may receive and save, by using the mobile terminal, the second token sent by the push server, and the second application may send the second token to the application server by using the mobile terminal.

As described above, the notification message received by the push server is sent by the application server to the push server. Therefore, after the mobile terminal receives the second token, the second application needs to send the second token to the application server by using the mobile terminal. After receiving the second token, the application server may send notification messages related to the second token to the push server according to the second token, so that the push server can send the notification messages to the mobile terminal.

Further, in an embodiment of the present disclosure, after the second token sent by the push server is received and saved, the method further includes destroying the second token when the mobile terminal exits the second operation mode.

In this embodiment of the present disclosure, the second operation mode may be a guest mode, and guests may not be a same user. Therefore, the second token may be destroyed when the mobile terminal exits the second operation mode. In this case, the mobile terminal needs to request a token again each time the mobile terminal enters the second operation mode. Therefore, regardless of whether the guests are a same guest or different guests, there can be a new token and a corresponding notification message is received to protect privacy security of different users.

Herein, it should be noted that, the mobile terminal sends the second registration message to the push server, the push server sends the generated second token to the mobile terminal, and then the mobile terminal sends the received second token to the application server. Therefore, the push server and the mobile terminal may save the second token, or may not save the real second token, and the real second token is saved on the application server.

If the push server and the mobile terminal do not save the second token, a possible case is that after generating the second token, the push server may obtain information related to the second token and save the information related to the second token. A case is the same for the mobile terminal: A possible case is that after receiving the second token, the mobile terminal may obtain information related to the second token and save the information related to the second token. In addition, if both the information saved by the push server and the information saved by the mobile terminal are information related to the second token, the information saved by the push server and the information saved by the mobile terminal may be same information, or may be different information.

In this case, that the mobile terminal destroys the second token, which is described above, may actually mean that the mobile terminal destroys the locally stored second token, or mean that the mobile terminal destroys the locally stored information related to the second token.

For the push server, the application server, and the mobile terminal, a case concerning the first token is the same. Details are not described herein.

Further, in an embodiment of the present disclosure, after the second token sent by the push server is received and saved, the method further includes sending a second instruction message to the push server when the mobile terminal exits the second operation mode, where the second instruction message is used to instruct the push server to destroy the second token.

In this embodiment of the present disclosure, the second operation mode may be a guest mode, and guests may not be a same user. Therefore, when the mobile terminal exits the second operation mode, the mobile terminal needs to destroy the second token, and in addition, the mobile terminal further needs to instruct the push server to destroy the second token, so as to prevent the push server from continuing to use the second token. In addition, because the push server may save the second token, or may save the information related to the second token, destroying the second token by the push server may be destroying the locally stored second token or destroying the locally stored information related to the second token.

Optionally, in this embodiment of the present disclosure, after the second token sent by the push server is received and saved, the method further includes sending a second instruction message to the application server when the mobile terminal exits the second operation mode, where the second instruction message is used to instruct the application server to destroy the second token.

Because the real second token is stored on a side of the application server, the mobile terminal may directly instruct the application server to destroy the second token. In this case, the application server no longer continues to use the second token.

Further, in an embodiment of the present disclosure, after the second token sent by the push server is received and saved, the method further includes sending a third instruction message to the push server when the mobile terminal exits the second operation mode, where the third instruction message is used to instruct the push server to temporarily store the second token.

Optionally, in this embodiment of the present disclosure, temporarily storing the second token includes temporarily storing at least one fourth notification message related to the second token, and after a fourth instruction message is received, sending the temporarily stored at least one fourth notification message to the mobile terminal, where the fourth instruction message is sent by the mobile terminal, and the fourth instruction message is used to instruct to activate the second token.

In this embodiment of the present disclosure, the second operation mode may be a guest mode, or may be another mode, for example, may be an office mode. Therefore, in this case, the corresponding first operation mode may be, for example, a common user mode, that is, a user who uses the mobile terminal in the first operation mode and a user who uses the mobile terminal in the second operation mode may be different users, or may be a same user. If the second operation mode is the office mode, that is, the user who uses the mobile terminal in the first operation mode and the user who uses the mobile terminal in the second operation mode are a same user, when the mobile terminal exits the second operation mode, the mobile terminal does not need to destroy the second token, and may temporarily store the second token for next use. In addition, the mobile terminal may instruct the push server to temporarily store (or also referred to as suspend) the second token, that is, to first temporarily store the at least one fourth notification message related to the second token. In this case, when exiting the second operation mode, the mobile terminal no longer receives the notification message related to the second token. When the mobile terminal enters the second operation mode again, the mobile terminal may activate the second token, and may also send the fourth instruction message to the push server to instruct the push server to activate the second token. In this case, after activating the second token, the push server may send the temporarily stored at least one fourth notification message to the mobile terminal.

In addition, because the push server may save the second token, or may save the information related to the second token, suspending the second token by the push server may be suspending the locally stored second token or suspending the locally stored information related to the second token.

Further, in an embodiment of the present disclosure, after the second token sent by the push server is received and saved, the method further includes sending a third instruction message to the application server when the mobile terminal exits the second operation mode, where the third instruction message is used to instruct the application server to temporarily store the second token.

Optionally, in this embodiment of the present disclosure, the temporarily storing the second token includes temporarily storing at least one fourth notification message related to the second token, and after a fourth instruction message is received, sending the temporarily stored at least one fourth notification message to the push server, where the fourth instruction message is used to instruct to activate the second token.

Because the real second token is stored on a side of the application server, the mobile terminal may directly instruct the application server to temporarily store the second token, that is, to first temporarily store the at least one fourth notification message related to the second token. In this case, when exiting the second operation mode, the mobile terminal no longer receives the notification message related to the second token. When the mobile terminal enters the second operation mode again, the mobile terminal may activate the second token, and may also send the fourth instruction message to the application server to instruct the application server to activate the second token. In this case, after activating the second token, the application server may send the temporarily stored at least one fourth notification message to the push server.

The mobile terminal may directly send the fourth instruction message to the application server, or may send the fourth instruction message to the application server by using the push server.

Step 103: Receive at least one third notification message that is related to a second token and sent by the push server, where the second token is a second identification that is of the mobile terminal in the second operation mode and that is used for a push service.

After the second token is used, a notification message related to the second token is received. Herein, this type of notification message is referred to as the third notification message.

In addition, although both the third notification message and the fourth notification message are notification messages related to the second token, receiving times are different: The third notification message is received when the mobile terminal uses the second token, and the fourth notification message is received when the mobile terminal stops using the second token. Therefore, for distinguishing messages, the notification messages are respectively referred to as the third notification message and the fourth notification message.

Figure 2A:
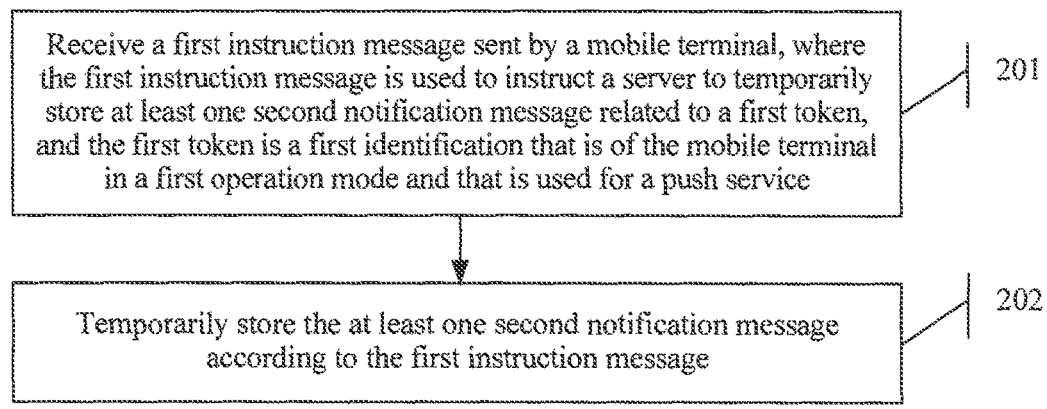
FIG. 2A is a main flowchart of an information processing method according to an embodiment of the present disclosure.

Referring to FIG. 2A, based on a same inventive concept, an embodiment of the present disclosure provides an information processing method. The method may be executed by a server. The server herein may be the push server described in the procedure in FIG. 1, or may be the application server described in the procedure in FIG. 1. A main procedure of the method is described as follows.

Step 201: Receive a first instruction message sent by a mobile terminal, where the first instruction message is used to instruct the server to temporarily store at least one second notification message related to a first token, and the first token is a first identification that is of the mobile terminal in the first operation mode and that is used for a push service.

Step 202: Temporarily store the at least one second notification message according to the first instruction message.

As described in descriptions of the procedure in FIG. 1, the mobile terminal has at least the first operation mode and a second operation mode. When the mobile terminal is in the first operation mode, the first token is used.

When the mobile terminal switches from the first operation mode to the second operation mode, the first token should be temporarily suspended, and the mobile terminal sends the first instruction message to the server to instruct the server to temporarily store the at least one second notification message. The second notification message is a message related to the first token, and is received by the server when the mobile terminal stops using the first token, or is received by the server before the mobile terminal stops using the first token but is not sent to the mobile terminal. That is, the server stores a subsequently received second notification message or a second notification message that has been received previously but is not sent to the mobile terminal, provided that the server receives the first instruction message.

Optionally, in this embodiment of the present disclosure, before the first instruction message sent by the mobile terminal is received, the method further includes: sending at least one first notification message related to the first token to the mobile terminal.

Before the server receives the first instruction message, it indicates that the first token is in a used state. In this case, provided that the server receives notification messages related to the first token, the server sends the notification messages to the mobile terminal. Herein, this type of notification message is referred to as the first notification message.

The server temporarily stores a notification message related to the first token, provided that the server receives the first instruction message. Herein, this type of notification message is referred to as the second notification message.

Because the server may be the push server, or may be the application server, the following separately provides descriptions.

1. The server is the push server.

Optionally, in this embodiment of the present disclosure, before the at least one first notification message related to the first token is sent to the mobile terminal, the method may further include receiving a first registration request sent by the mobile terminal, where the first registration request is used to request the push server to generate the first token, and the first token is used for the push service of the mobile terminal in the first operation mode, where the mobile terminal has at least the first operation mode and the second operation mode; and generating the first token according to the first registration request, and sending the first token to the mobile terminal.

A specific manner in which the mobile terminal sends the first registration request and the push server sends the first token to the mobile terminal is described in the procedure in FIG. 1. Details are not described herein.

Optionally, in this embodiment of the present disclosure, after the first instruction message sent by the mobile terminal is received, the method may further include receiving a second registration request sent by the mobile terminal, where the second registration request is used to request the push server to generate a second token, and the second token is used for a push service of the mobile terminal in the second operation mode; and generating the second token according to the second registration request, and sending the second token to the mobile terminal.

A specific manner in which the mobile terminal sends the second registration request and the push server sends the second token to the mobile terminal is described in the procedure in FIG. 1. Details are not described herein.

Optionally, in this embodiment of the present disclosure, after the second token is sent to the mobile terminal, the method may further include sending at least one third notification message related to the second token to the mobile terminal, where the second token is a second identification that is of the mobile terminal in the second operation mode and is used for the push service.

In this embodiment of the present disclosure, after use of the second token is determined, provided that the push server receives notification messages related to the second token, the push server may send the notification messages to the mobile terminal, which is specifically sending the notification messages to the second application by using the mobile terminal. Herein, this type of notification message is referred to as the third notification message.

Optionally, in this embodiment of the present disclosure, after the second token is sent to the mobile terminal, the method may further include receiving a second instruction message sent by the mobile terminal, where the second instruction message is used to instruct the push server to destroy the second token and to activate the first token; and destroying the second token and activating the first token, according to the second instruction message.

In this embodiment of the present disclosure, the second operation mode is a guest mode, and guests may not be a same user. Therefore, when the mobile terminal exits the second operation mode, the mobile terminal may destroy the second token. In this case, a next guest may re-apply for a token when using the second operation mode, which protects information security of different guests.

In addition, in this embodiment of the present disclosure, the mobile terminal needs to destroy the second token, and in addition, the mobile terminal further needs to instruct the push server to destroy the second token, so as to prevent the push server from continuing to use the second token.

Destroying the second token by the push server may be destroying the locally stored second token or destroying locally stored information related to the second token.

For example, if the mobile terminal switches from the second operation mode to the first operation mode, in addition to instructing the push server to destroy the second token, the second instruction message sent by the mobile terminal may instruct the push server to re-activate the first token, that is, to re-enable the first token. In this embodiment of the present disclosure, it is assumed that the first operation mode is an owner mode. One mobile terminal generally has only one owner. Therefore, a token in the owner mode does not need to be destroyed when the mobile terminal exits the owner mode. In this case, when the mobile terminal enters the owner mode again next time, the token may be re-enabled, and the push server does not need to re-generate a token.

Optionally, in this embodiment of the present disclosure, after the second token is destroyed and the first token is activated, according to the second instruction message, the method may further include sending the temporarily stored at least one second notification message to the mobile terminal.

After stopping using the first token, the push server stores some notification messages related to the first token, that is, stores the at least one second notification message. Therefore, after re-activating the first token, the push server may send the stored notification messages related to the first token to the mobile terminal.

Optionally, in this embodiment of the present disclosure, after the second token is sent to the mobile terminal, the method further includes receiving a third instruction message sent by the mobile terminal, where the third instruction message is used to instruct the push server to temporarily store the second token and to activate the first token; and temporarily storing the second token and activating the first token according to the third instruction message.

Optionally, in this embodiment of the present disclosure, the temporarily storing the second token includes temporarily storing at least one fourth notification message related to the second token, and after a fourth instruction message is received, sending the temporarily stored at least one fourth notification message to the mobile terminal, where the fourth instruction message is sent by the mobile terminal, and the fourth instruction message is used to instruct to activate the second token.

Suspending the second token by the push server may be suspending the locally stored second token or suspending locally stored information related to the second token.

In this embodiment of the present disclosure, the second operation mode may be a guest mode, or may be another mode, for example, may be an office mode. Therefore, in this case, the corresponding first operation mode may be, for example, a common user mode, that is, a user who uses the mobile terminal in the first operation mode and a user who uses the mobile terminal in the second operation mode may be different users, or may be a same user. If the second operation mode is the office mode, that is, the user who uses the mobile terminal in the first operation mode and the user who uses the mobile terminal in the second operation mode are a same user, when the mobile terminal exits the second operation mode, the mobile terminal does not need to destroy the second token, and may temporarily store the second token for next use. In addition, the mobile terminal may instruct the push server to temporarily store the second token, that is, to first temporarily store the at least one fourth notification message related to the second token. In this case, when exiting the second operation mode, the mobile terminal no longer receives the notification message related to the second token. When the mobile terminal enters the second operation mode again, the mobile terminal may activate the second token, and may also send the fourth instruction message to the push server to instruct the push server to activate the second token. In this case, after activating the second token, the push server may send the temporarily stored at least one fourth notification message to the mobile terminal.

Optionally, in this embodiment of the present disclosure, after the second token is temporarily stored and the first token is activated, according to the third instruction message, the method further includes sending the temporarily stored at least one second notification message to the mobile terminal.

In this embodiment, the application server may store the first token and the second token. In this case, the application server sends both the notification message related to the first token and the notification message related to the second token to the push server, and the push server determines, according to a status of a local token, notification messages that are to be temporarily stored and notification messages that are to be sent to the mobile terminal. For example, if the push server determines that the first token is temporarily suspended and that the second token is in an active state, the push server may temporarily store the notification message related to the first token and send the notification message related to the second token to the mobile terminal. That is, in this embodiment, the push server performs information screening, and the application server is responsible only for information forwarding and may not perform information screening.

2. The server is the application server.

Optionally, in this embodiment of the present disclosure, after the first instruction message sent by the mobile terminal is received, the method may further include receiving a second token sent by the mobile terminal, where the second token is a second identification that is of the mobile terminal in the second operation mode and that is used for a push service.

In this embodiment of the present disclosure, after requesting and obtaining the second token from the push server, the mobile terminal needs to send the second token to the application server, so that the application server sends notification messages related to the second token to the push server according to the second token, and the push server can send the notification messages to the mobile terminal.

The mobile terminal may directly send the second token to the application server, or may send the second token to the application server by using the push server.

Optionally, in this embodiment of the present disclosure, after the second token sent by the mobile terminal is received, the method may further include sending at least one third notification message related to the second token to the push server.

After receiving the second token, if receiving the notification messages related to the second token, the application server sends the notification messages to the push server, so as to send the notification messages to the mobile terminal by using the push server. Herein, this type of notification message is referred to as the third notification message.

Optionally, in this embodiment of the present disclosure, after the second token sent by the mobile terminal is received, the method may further include receiving a second instruction message sent by the mobile terminal, where the second instruction message is used to instruct the application server to destroy the second token and to activate the first token; and destroying the second token and activating the first token, according to the second instruction message.

In this embodiment of the present disclosure, the second operation mode is a guest mode, and guests may not be a same user. Therefore, when the mobile terminal exits the second operation mode, the mobile terminal may destroy the second token. In this case, a next guest may re-apply for a token when using the second operation mode, which protects information security of different guests.

In addition, in this embodiment of the present disclosure, the mobile terminal needs to destroy the second token, and in addition, the mobile terminal further needs to instruct the application server to destroy the second token, so as to prevent the application server from continuing to use the second token.

For example, if the mobile terminal switches from the second operation mode to the first operation mode, in addition to instructing the application server to destroy the second token, the second instruction message sent by the mobile terminal may instruct the application server to re-activate the first token, that is, to re-enable the first token.

The mobile terminal may directly send the second instruction message to the application server, or may send the second instruction message to the application server by using the push server.

Optionally, in this embodiment of the present disclosure, after the second token is destroyed and the first token is activated, according to the second instruction message, the method may further include sending the temporarily stored at least one second notification message to the push server.

After stopping using the first token, the application server stores some notification messages related to the first token, that is, stores the at least one second notification message. Therefore, after re-activating the first token, the application server may send the stored notification messages related to the first token to the push server, so as to send the notification messages to the mobile terminal by using the push server.

Optionally, in this embodiment of the present disclosure, after the second token sent by the mobile terminal is received, the method further includes: receiving a third instruction message sent by the mobile terminal, where the third instruction message is used to instruct the application server to temporarily store the second token and to activate the first token; and temporarily storing the second token and activating the first token, according to the third instruction message.

Optionally, in this embodiment of the present disclosure, the temporarily storing the second token includes: temporarily storing at least one fourth notification message related to the second token, and after a fourth instruction message is received, sending the temporarily stored at least one fourth notification message to the push server, where the fourth instruction message is used to instruct to activate the second token.

The mobile terminal may directly send the third instruction message to the application server, or may send the third instruction message to the application server by using the push server.

Optionally, in this embodiment of the present disclosure, after the second token is temporarily stored and the first token is activated, according to the third instruction message, the method further includes sending the temporarily stored at least one second notification message to the push server.

In this embodiment, the application server may store the first token and the second token, and the application server receives the notification message related to the first token and the notification message related to the second token. Each time the application server receives a notification message, the application server determines whether a state of a token corresponding to the notification message is a disabled state or an active state. If the state is the disabled state, the application server temporarily stores the notification message. If the state is the active state, the application server sends the notification message to the push server, and the push server directly sends the notification message to the mobile terminal without performing determining again. That is, in this embodiment, the application server performs information screening, and the push server is responsible only for information forwarding and may not perform information screening.

The following describes an information processing process in this embodiment of the present disclosure by using two specific examples.

Figure 2B:
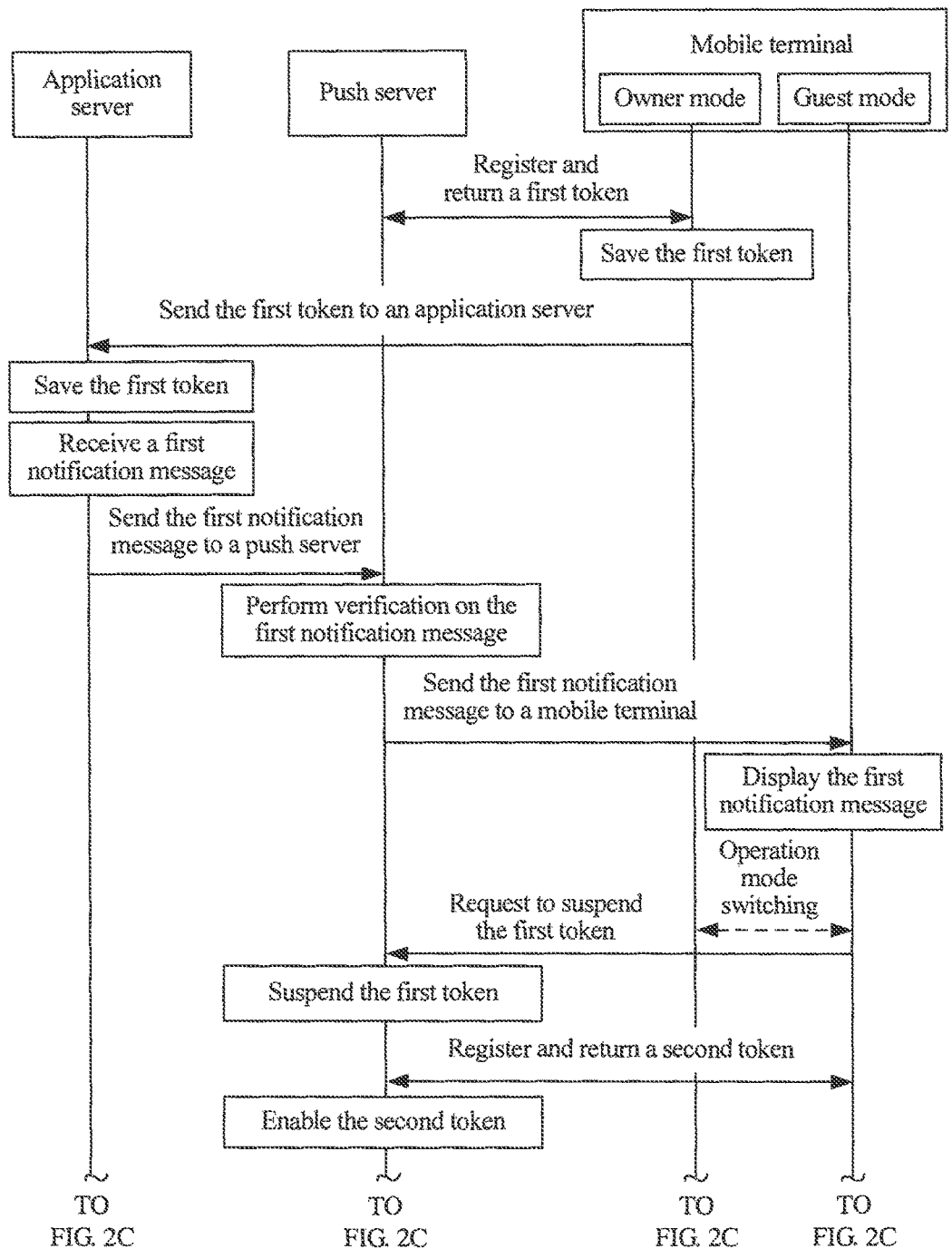
FIG. 2B is a detailed flowchart of an information processing process according to an embodiment of the present disclosure.
Figure 2C:
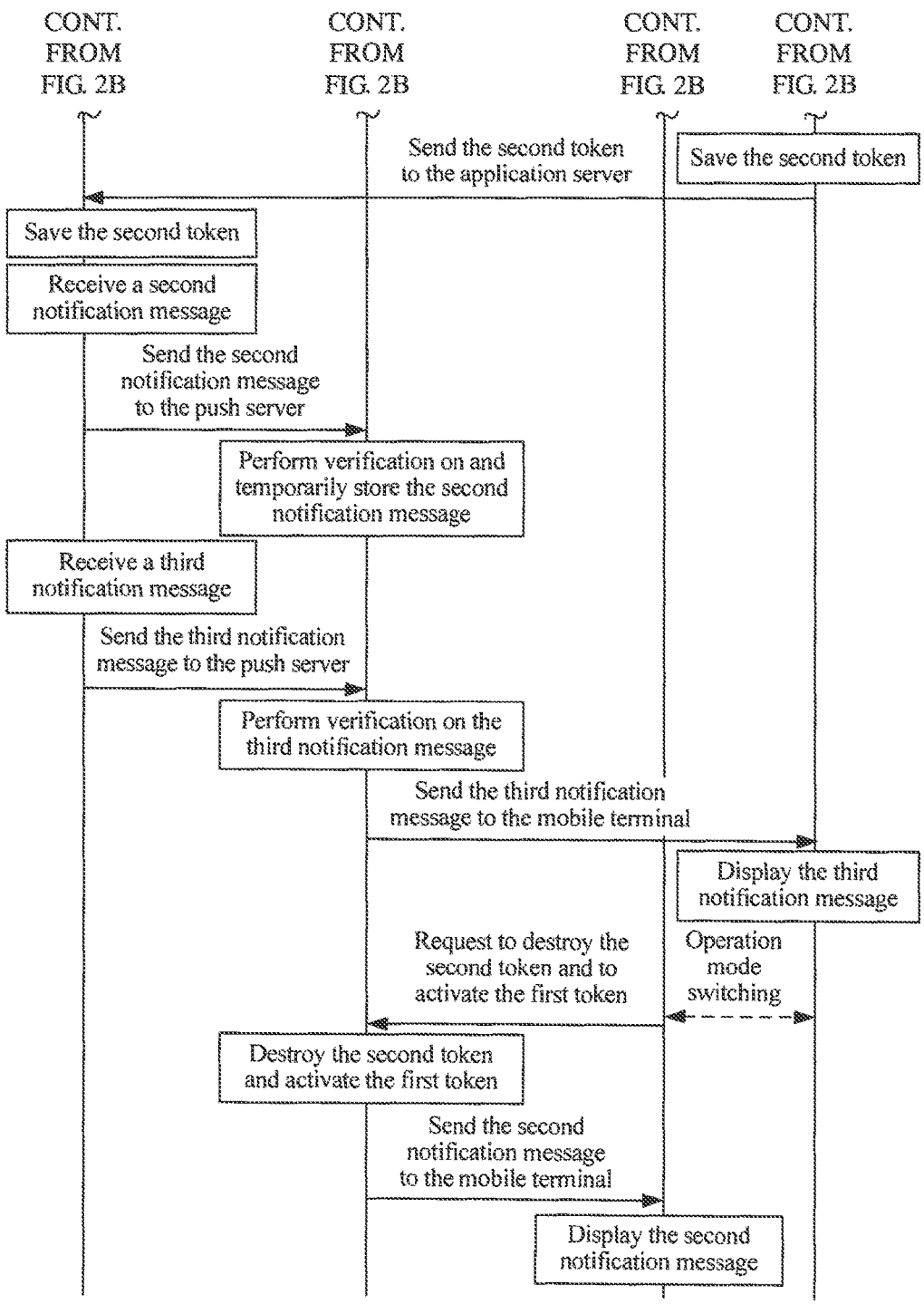
FIG. 2C is a detailed flowchart of an information processing process according to an embodiment of the present disclosure.

Referring to FIG. 2B and FIG. 2C, FIG. 2B and FIG. 2C are a detailed flowchart of a possible information processing process according to an embodiment of the present disclosure. In FIG. 2B and FIG. 2C, an example in which the first operation mode is an owner mode and the second operation mode is a guest mode is used.

First, when being in the owner mode, the mobile terminal sends the first registration request to the push server to request the push server to generate the first token that is of the mobile terminal, used for a push service, and corresponding to the owner mode. The push server generates the first token according to the first registration request and a mobile terminal ID, and sends the first token to the mobile terminal.

The mobile terminal saves the first token.

The mobile terminal sends the first token to the application server, and the application server saves the first token.

Then the application server receives a notification message. For example, if the received notification message is a notification message corresponding to the owner mode, that is, is the first notification message, the application server sends the first notification message to the push server.

The push server receives and performs verification on the first notification message. The first notification message is a notification message related to the first token, and the first token is in a used state. Therefore, the push server directly sends the first notification message to the mobile terminal according to a target device corresponding to the first notification message, and the mobile terminal may display the notification message that is in the owner mode, that is, display the first notification message.

Then the mobile terminal switches between the operation modes, that is, switches from the owner mode to the guest mode.

In the guest mode, the mobile terminal sends the first instruction message to the push server to instruct the push server to temporarily store the at least one second notification message related to the first token, that is, to suspend the first token.

The push server suspends the first token according to the instruction.

In addition, the mobile terminal may send the second registration request to the push server to request the push server to generate the second token that is of the mobile terminal, used for a push service, and corresponding to the guest mode. The push server generates the second token according to the second registration request and the ID of the mobile terminal, and sends the second token to the mobile terminal.

The push server enables the second token, and the mobile terminal also saves the second token.

After receiving the second token, the mobile terminal sends the second token to the application server, and the application server saves the second token.

Then the application server receives a notification message. For example, if the received notification message is a notification message corresponding to the owner mode, that is, is the second notification message, the application server sends the second notification message to the push server.

The push server receives and performs verification on the second notification message. The second notification message is a notification message related to the first token, but the first token is suspended. Therefore, the push server stores the second notification message, for example, stores the second notification message to a notification queue corresponding to the owner mode and does not send the second notification message to the mobile terminal.

If the notification message received by the application server is a notification message corresponding to the guest mode, that is, is the third notification message, the application server sends the third notification message to the push server.

The push server receives and performs verification on the third notification message. The third notification message is a notification message related to the second token, and the second token is in an active state. Therefore, the push server directly sends the third notification message to the mobile terminal according to a target device corresponding to the third notification message, and the mobile terminal may display the notification message that is in the guest mode, that is, display the third notification message.

The mobile terminal switches between the operation modes again, that is, switches from the guest mode to the owner mode.

The mobile terminal sends the second instruction message to the push server to instruct the push server to destroy the second token and to activate the first token.

The push server destroys the second token and activates the first token, according to the second instruction message. In addition, the push server may further send the temporarily stored second notification message related to the first token to the mobile terminal.

The mobile terminal may display the received second notification message.

Figure 2D:
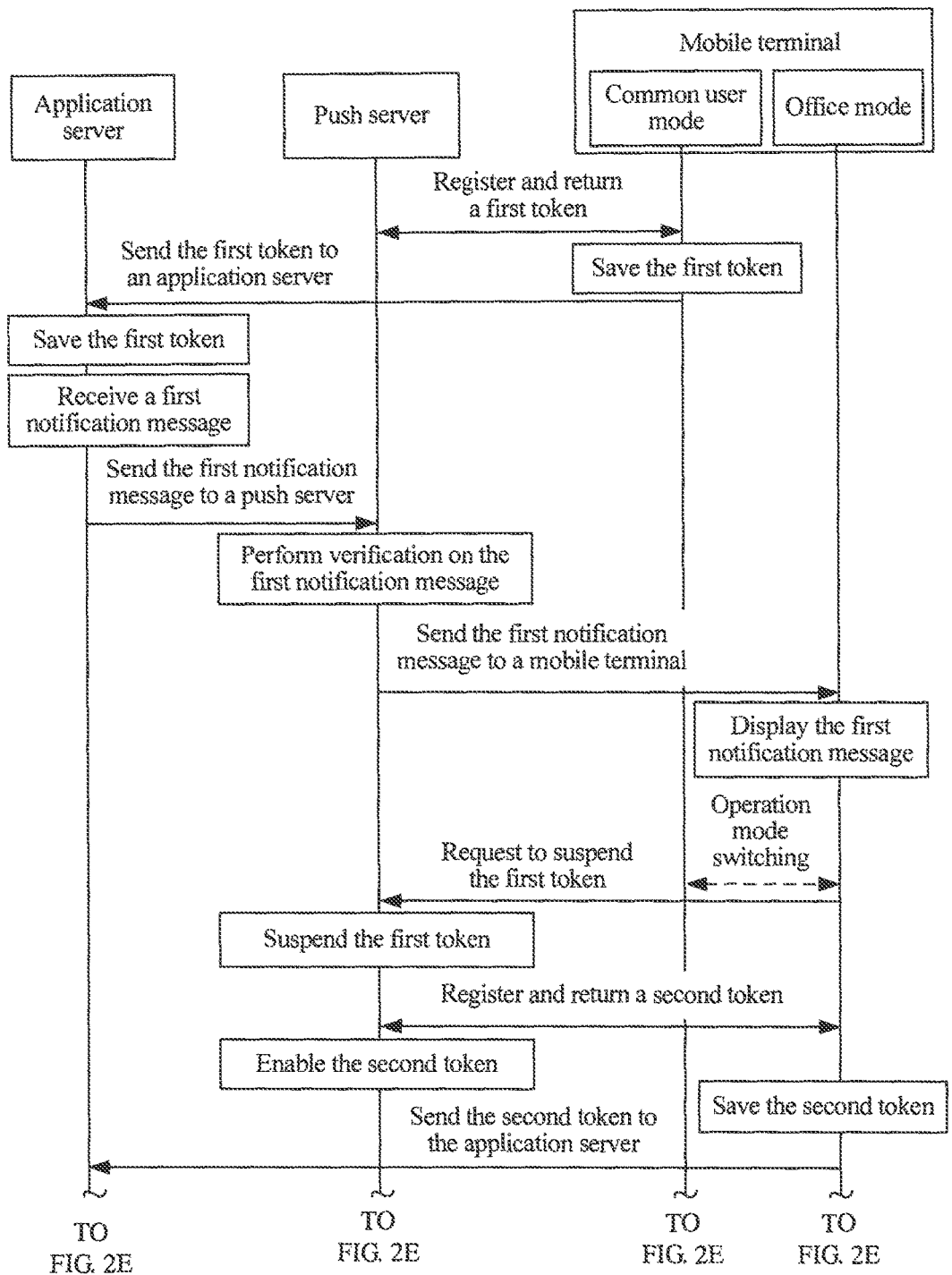
FIG. 2D is a detailed flowchart of another example of an information processing process according to an embodiment of the present disclosure.
Figure 2E:
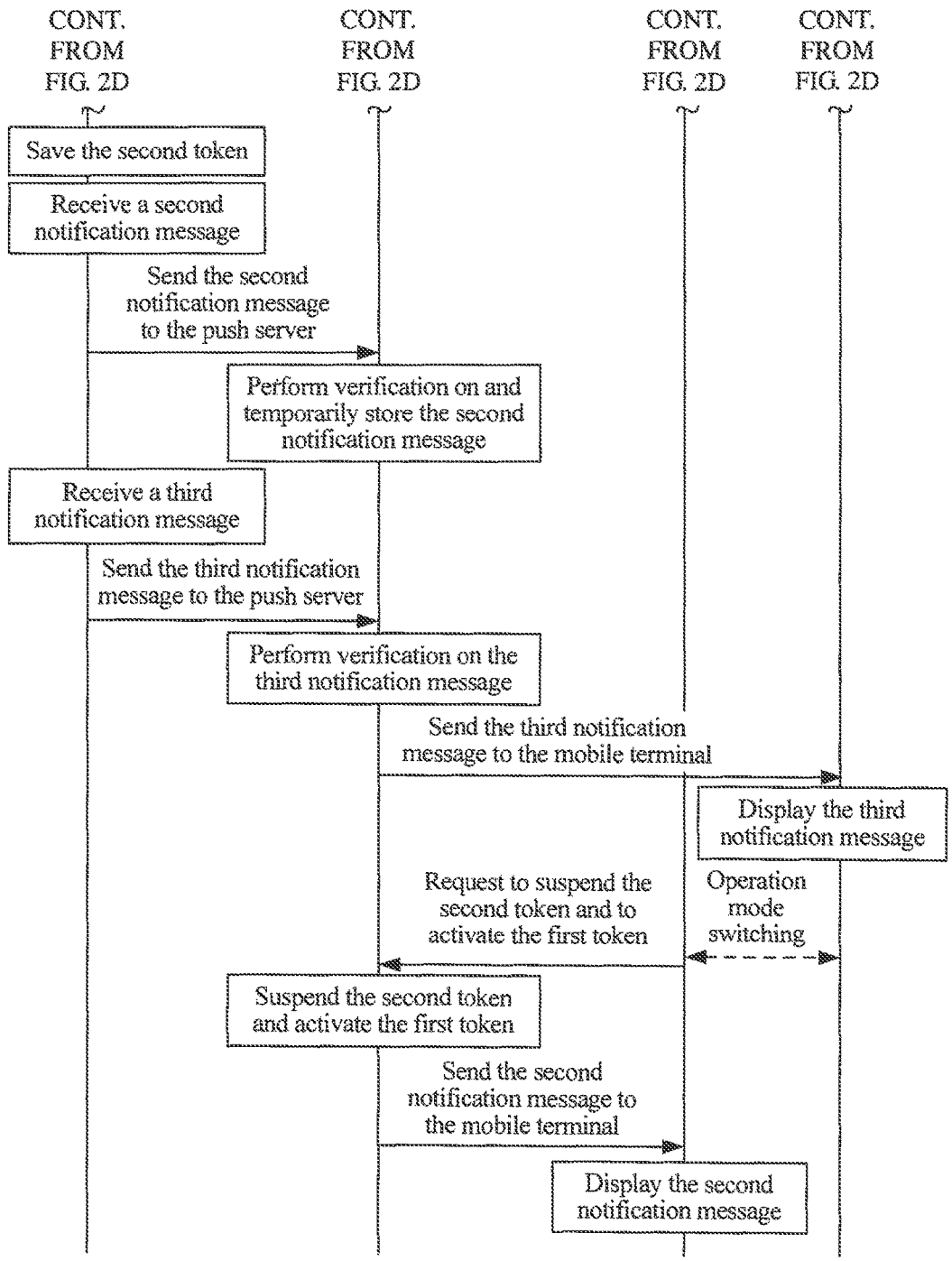
FIG. 2E is a detailed flowchart of an information processing process according to an embodiment of the present disclosure.

Referring to FIG. 2D and FIG. 2E, FIG. 2D and FIG. 2E are a detailed flowchart of another possible information processing process according to an embodiment of the present disclosure. In FIG. 2D and FIG. 2E, an example in which the first operation mode is a common user mode and the second operation mode is an office mode is used.

First, when being in the common user mode, the mobile terminal sends the first registration request to the push server to request the push server to generate the first token of the mobile terminal that is used for a push service and corresponding to the common user mode. The push server generates the first token according to the first registration request and a mobile terminal ID, and sends the first token to the mobile terminal.

The mobile terminal saves the first token.

The mobile terminal sends the first token to the application server, and the application server saves the first token.

Then the application server receives a notification message. For example, if the received notification message is a notification message corresponding to the common user mode, that is, receives the first notification message, the application server sends the first notification message to the push server.

The push server receives and performs verification on the first notification message. The first notification message is a notification message related to the first token, and the first token is in a used state. Therefore, the push server directly sends the first notification message to the mobile terminal according to a target device corresponding to the first notification message. The mobile terminal may display the notification message that is in the common user mode, that is, display the first notification message.

Then the mobile terminal switches between the operation modes, that is, switches from the common user mode to the office mode.

In the office mode, the mobile terminal sends the first instruction message to the push server to instruct the push server to temporarily store the at least one second notification message related to the first token, that is, to suspend the first token.

The push server suspends the first token according to the instruction.

In addition, the mobile terminal may send the second registration request to the push server to request the push server to generate the second token that is of the mobile terminal, used for a push service, and corresponding to the office mode. The push server generates the second token according to the second registration request and the mobile terminal ID, and sends the second token to the mobile terminal.

The push server enables the second token, and the mobile terminal also saves the second token.

After receiving the second token, the mobile terminal sends the second token to the application server, and the application server saves the second token.

Then the application server receives a notification message. For example, if the received notification message is a notification message corresponding to the owner mode, that is, is the second notification message, the application server sends the second notification message to the push server.

The push server receives and performs verification on the second notification message. The second notification message is a notification message related to the first token, but the first token is suspended. Therefore, the push server stores the second notification message, for example, stores the second notification message to a notification queue corresponding to the common user mode and does not send the second notification message to the mobile terminal.

If the notification message received by the application server is a notification message corresponding to the office mode, that is, is the third notification message, the application server sends the third notification message to the push server.

The push server receives and performs verification on the third notification message. The third notification message is a notification message related to the second token, and the second token is in an active state. Therefore, the push server directly sends the third notification message to the mobile terminal according to a target device corresponding to the third notification message, and the mobile terminal may display the notification message that is in the office mode, that is, display the third notification message.

The mobile terminal switches between the operation modes again, that is, switches from the office mode to the common user mode.

The mobile terminal sends the second instruction message to the push server to instruct the push server to suspend the second token, that is, to temporarily store the at least one fourth notification message related to the second token, and to activate the first token.

The push server suspends the second token and activates the first token, according to the second instruction message. In addition, the push server may further send the temporarily stored second notification message related to the first token to the mobile terminal.

The mobile terminal may display the received second notification message.

Certainly, if then the mobile terminal switches between the operation modes again, that is, switches from the office mode back to the common user mode, the push server and the application server may further suspend the first token and re-activate the second token, according to the instruction of the mobile terminal, and send the stored at least one fourth notification message related to the second token to the mobile terminal.

Figure 3:
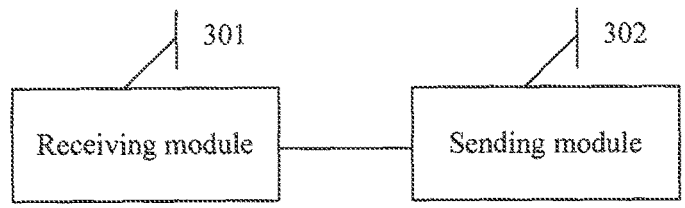
FIG. 3 is a main structural block diagram of a mobile terminal according to an embodiment of the present disclosure.

Referring to FIG. 3, based on a same inventive concept, an embodiment of the present disclosure provides a mobile terminal. The mobile terminal may be the mobile terminal described in the procedure in FIG. 1 and in the procedure in FIG. 2. The mobile terminal has at least a first operation mode and a second operation mode, and the first operation mode is different from the second operation mode. The mobile terminal may include a receiving module 301 and a sending module 302.

The receiving module 301 is configured to receive, when the mobile terminal is in the first operation mode, at least one first notification message that is related to a first token and sent by a push server, where the first token is a first identification that is of the mobile terminal in the first operation mode and that is used for a push service.

The sending module 302 is configured to send a first instruction message to the push server when the mobile terminal switches from the first operation mode to the second operation mode, where the first instruction message is used to instruct the push server to temporarily store at least one second notification message related to the first token.

The receiving module 301 is further configured to receive at least one third notification message that is related to a second token and sent by the push server, where the second token is a second identification that is of the mobile terminal in the second operation mode and that is used for a push service.

Optionally, in this embodiment of the present disclosure, the sending module 302 is further configured to send a first registration request to the push server before the at least one first notification message that is related to the first token and sent by the push server is received. The first registration request is used to request the push server to generate the first token, and the first token is used for the push service of the mobile terminal in the first operation mode. The receiving module 301 is further configured to receive the first token sent by the push server.

Optionally, in this embodiment of the present disclosure, the sending module 302 is further configured to send, after the receiving module receives the first token sent by the push server, the first token to an application server, where the first token is used by the application server to send the at least one first notification message and the at least one second notification message to the push server according to the first token.

Optionally, in this embodiment of the present disclosure, the sending module 302 is further configured to send, after sending the first instruction message to the push server, a second registration request to the push server, where the second registration request is used to request the push server to generate the second token. The second token is used for the push service of the mobile terminal in the second operation mode. The receiving module 302 is further configured to receive and save the second token sent by the push server. The sending module 301 is further configured to send the second token to an application server, where the second token is used by the application server to send the at least one third notification message to the push server according to the second token.

Optionally, in this embodiment of the present disclosure, the mobile terminal further includes a destruction module configured to: after the receiving module 301 receives and saves the second token sent by the push server, destroy the second token when the mobile terminal exits the second operation mode.

Optionally, in this embodiment of the present disclosure, the sending module 302 is further configured to send, after the receiving module 301 receives and saves the second token sent by the push server, a second instruction message to the push server when the mobile terminal exits the second operation mode, where the second instruction message is used to instruct the push server to destroy the second token.

Optionally, in this embodiment of the present disclosure, the sending module 302 is further configured to send, after the receiving module 301 receives and saves the second token sent by the push server, a second instruction message to the application server when the mobile terminal exits the second operation mode, where the second instruction message is used to instruct the application server to destroy the second token.

Optionally, in this embodiment of the present disclosure, the sending module 302 is further configured to send, after the receiving module 301 receives and saves the second token sent by the push server, a third instruction message to the push server when the mobile terminal exits the second operation mode, where the third instruction message is used to instruct the push server to temporarily store the second token.

Optionally, in this embodiment of the present disclosure, that the second token is temporarily stored includes at least one fourth notification message related to the second token is temporarily stored. After a fourth instruction message is received, the temporarily stored at least one fourth notification message is sent to the mobile terminal, where the fourth instruction message is sent by the mobile terminal, and the fourth instruction message is used to instruct to activate the second token.

Certainly, herein an operation of temporarily storing the second token is completed by the push server.

Optionally, in this embodiment of the present disclosure, the sending module 302 is further configured to send, after the receiving module 301 receives and saves the second token sent by the push server, a third instruction message to the application server when the mobile terminal exits the second operation mode. The third instruction message is used to instruct the application server to temporarily store the second token.

Optionally, in this embodiment of the present disclosure, that the second token is temporarily stored includes at least one fourth notification message related to the second token is temporarily stored. After a fourth instruction message is received, the temporarily stored at least one fourth notification message is sent to the push server, where the fourth instruction message is used to instruct to activate the second token.

Certainly, herein an operation of temporarily storing the second token is completed by the application server.

Figure 4:
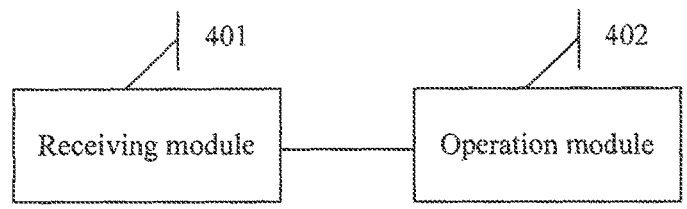
FIG. 4 is a main structural block diagram of a server according to an embodiment of the present disclosure.

Referring to FIG. 4, based on a same inventive concept, an embodiment of the present disclosure provides a server. The server may be the server described in the procedure in FIG. 1, in the procedure in FIG. 2, and in FIG. 3. The server may include a receiving module 401 and an operation module 402.

The receiving module 401 is configured to receive a first instruction message sent by a mobile terminal, where the first instruction message is used to instruct the server to temporarily store at least one second notification message related to a first token, and the first token is a first identification that is of the mobile terminal in the first operation mode and that is used for a push service.

The operation module 402 is configured to temporarily store the at least one second notification message according to the first instruction message.

Optionally, in this embodiment of the present disclosure, the server further includes a sending module configured to send, before the receiving module 401 receives the first instruction message sent by the mobile terminal, at least one first notification message related to the first token to the mobile terminal.

Optionally, in this embodiment of the present disclosure, if the server is a push server, the push server further includes a processing module.

The receiving module 401 is further configured to receive, before the sending module sends the at least one first notification message related to the first token to the mobile terminal, a first registration request sent by the mobile terminal. The first registration request is used to request the push server to generate the first token, and the first token is used for the push service of the mobile terminal in the first operation mode, where the mobile terminal has at least the first operation mode and a second operation mode.

The processing module is configured to generate the first token according to the first registration request, and send the first token to the mobile terminal by using the sending module.

Optionally, in this embodiment of the present disclosure, the receiving module 401 is further configured to receive, after receiving the first instruction message sent by the mobile terminal, a second registration request sent by the mobile terminal. The second registration request is used to request the push server to generate a second token, and the second token is used for a push service of the mobile terminal in the second operation mode. The processing module is further configured to generate the second token according to the second registration request, and send the second token to the mobile terminal by using the sending module.

Optionally, in this embodiment of the present disclosure, the sending module is further configured to send, after sending the second token to the mobile terminal, at least one third notification message related to the second token to the mobile terminal, where the second token is a second identification that is of the mobile terminal in the second operation mode and that is used for the push service.

Optionally, in this embodiment of the present disclosure, the receiving module 401 is further configured to receive, after the sending module sends the second token to the mobile terminal, a second instruction message sent by the mobile terminal, where the second instruction message is used to instruct the push server to destroy the second token and to activate the first token. The processing module is further configured to destroy the second token and activate the first token, according to the second instruction message.

Optionally, in this embodiment of the present disclosure, the sending module is further configured to send the temporarily stored at least one second notification message to the mobile terminal after the processing module destroys the second token and activates the first token, according to the second instruction message.

Optionally, in this embodiment of the present disclosure, the receiving module 401 is further configured to receive, after the sending module sends the second token to the mobile terminal, a third instruction message sent by the mobile terminal, where the third instruction message is used to instruct the push server to temporarily store the second token and to activate the first token. The processing module is further configured to temporarily store the second token and activate the first token, according to the third instruction message.

Optionally, in this embodiment of the present disclosure, that the processing module is further configured to temporarily store the second token includes temporarily storing at least one fourth notification message related to the second token. After a fourth instruction message is received, sending the temporarily stored at least one fourth notification message to the mobile terminal by using the sending module, where the fourth instruction message is sent by the mobile terminal, and the fourth instruction message is used to instruct to activate the second token.

Optionally, in this embodiment of the present disclosure, the sending module is further configured to send the temporarily stored at least one second notification message to the mobile terminal after the processing module temporarily stores the second token and activates the first token, according to the third instruction message.

Optionally, in this embodiment of the present disclosure, if the server is an application server, the receiving module 401 is further configured to receive, after receiving the first instruction message sent by the mobile terminal, a second token sent by the mobile terminal, where the second token is a second identification that is of the mobile terminal in the second operation mode and that is used for a push service.

Optionally, in this embodiment of the present disclosure, the application server further includes a sending module, where the sending module in the application server and a sending module in the push server have the same name but are not the same module. The sending module is configured to send, after the receiving module receives the second token sent by the mobile terminal, at least one third notification message related to the second token to a push server.

Optionally, in this embodiment of the present disclosure, the application server further includes a processing module. The processing module in the application server and the processing module in the push server are different modules.

The receiving module 401 is further configured to receive, after receiving the second token sent by the mobile terminal, a second instruction message sent by the mobile terminal, where the second instruction message is used to instruct the push server to destroy the second token and to activate the first token.

The processing module is configured to destroy the second token and activate the first token, according to the second instruction message.

Optionally, in this embodiment of the present disclosure, the sending module is further configured to send the temporarily stored at least one second notification message to the push server after the processing module destroys the second token and activates the first token, according to the second instruction message.

Optionally, in this embodiment of the present disclosure, the application server further includes a processing module. The processing module in the application server and the processing module in the push server are different modules.

The receiving module 401 is further configured to receive, after receiving the second token sent by the mobile terminal, a third instruction message sent by the mobile terminal, where the third instruction message is used to instruct the application server to temporarily store the second token and to activate the first token.

The processing module is configured to temporarily store the second token and activate the first token, according to the third instruction message.

Optionally, in this embodiment of the present disclosure, the application server further includes the sending module. The processing module is configured to temporarily store the second token by temporarily storing at least one fourth notification message related to the second token, and after a fourth instruction message is received, sending the temporarily stored at least one fourth notification message to the push server by using the sending module, where the fourth instruction message is used to instruct to activate the second token.

Optionally, in this embodiment of the present disclosure, the sending module is further configured to send the temporarily stored at least one second notification message to the push server after the processing module temporarily stores the second token and activates the first token, according to the third instruction message.

Figure 5:
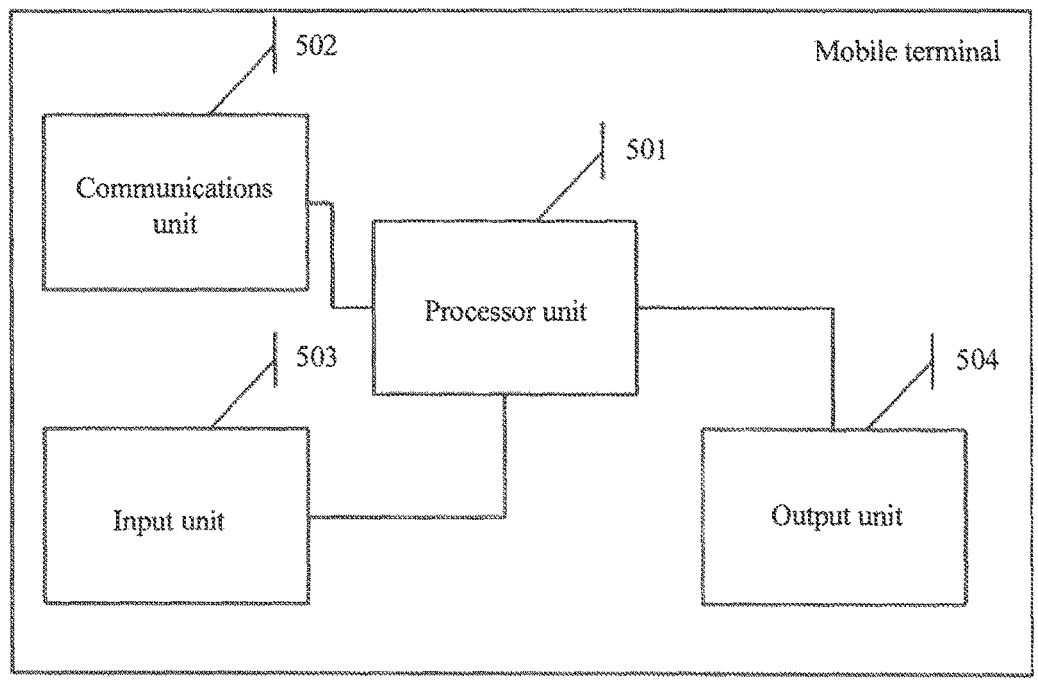
FIG. 5 is a main schematic structural diagram of a mobile terminal according to an embodiment of the present disclosure.

Referring to FIG. 5, based on a same inventive concept, an embodiment of the present disclosure provides a mobile terminal. The mobile terminal may be the mobile terminal described in the foregoing figures. The mobile terminal has at least a first operation mode and a second operation mode, where the first operation mode is different from the second operation mode, and the mobile terminal includes a communications unit 502, an input unit 503, and an output unit 504 that are connected to a same processor unit 501.

The communications unit 502 is configured to establish a first communication channel with a push server.

The input unit 503 is configured to receive, when the mobile terminal is in the first operation mode, with the first communication channel at least one first notification message that is related to a first token and sent by the push server, where the first token is a first identification that is of the mobile terminal in the first operation mode and that is used for a push service.

The output unit 504 is configured to send, by using the first communication channel, a first instruction message to the push server when the mobile terminal switches from the first operation mode to the second operation mode, where the first instruction message is used to instruct the push server to temporarily store at least one second notification message related to the first token.

The input unit 503 is further configured to receive, by using the first communication channel, at least one third notification message that is related to a second token and sent by the push server, where the second token is a second identification that is of the mobile terminal in the second operation mode and that is used for a push service.

Optionally, in this embodiment of the present disclosure, the output unit 504 is further configured to send, by using the first communication channel, a first registration request to the push server before the input unit 503 receives, by using the first communication channel, the at least one first notification message that is related to the first token and sent by the push server, where the first registration request is used to request the push server to generate the first token, and the first token is used for the push service of the mobile terminal in the first operation mode. The input unit 503 is further configured to receive, by using the first communication channel, the first token sent by the push server.

Optionally, in this embodiment of the present disclosure, the output unit 504 is further configured to send, after the input unit 503 receives by using the first communication channel the first token sent by the push server, the first token to an application server by using the first communication channel, where the first token is used by the application server to send the at least one first notification message and the at least one second notification message to the push server according to the first token.

Optionally, in this embodiment of the present disclosure, the output unit 504 is further configured to send, after sending the first instruction message to the push server by using the first communication channel, a second registration request to the push server by using the first communication channel, where the second registration request is used to request the push server to generate the second token, and the second token is used for the push service of the mobile terminal in the second operation mode. The input unit 503 is further configured to receive and save, by using the first communication channel, the second token sent by the push server. The output unit 504 is further configured to send the second token to an application server by using the first communication channel, where the second token is used by the application server to send the at least one third notification message to the push server according to the second token.

Optionally, in this embodiment of the present disclosure, the processor unit 501 is configured to destroy, after the input unit 503 receives and saves with the first communication channel the second token sent by the push server, the second token when the mobile terminal exits the second operation mode.

Optionally, in this embodiment of the present disclosure, the output unit 504 is further configured to send, after the input unit 503 receives and saves by using the first communication channel the second token sent by the push server, by using the first communication channel a second instruction message to the push server when the mobile terminal exits the second operation mode, where the second instruction message is used to instruct the push server to destroy the second token.

Optionally, in this embodiment of the present disclosure, the output unit 504 is further configured to send, after the input unit 503 receives and saves by using the first communication channel the second token sent by the push server, by using the first communication channel a second instruction message to the application server when the mobile terminal exits the second operation mode, where the second instruction message is used to instruct the application server to destroy the second token.

Optionally, in this embodiment of the present disclosure, the output unit 504 is further configured to send, after the input unit 503 receives and saves by using the first communication channel the second token sent by the push server, by using the first communication channel, a third instruction message to the push server when the mobile terminal exits the second operation mode, where the third instruction message is used to instruct the push server to temporarily store the second token.

Optionally, in this embodiment of the present disclosure, that the second token is temporarily stored includes temporarily storing at least one fourth notification message related to the second token. After a fourth instruction message is received, the temporarily stored at least one fourth notification message is sent to the mobile terminal, where the fourth instruction message is sent by the mobile terminal, and the fourth instruction message is used to instruct to activate the second token.

Certainly, herein an operation of temporarily storing the second token is completed by the push server.

Optionally, in this embodiment of the present disclosure, the output unit 504 is further configured to send, after the input unit 503 receives and saves by using the first communication channel the second token sent by the push server, by using the first communication channel a third instruction message to the application server when the mobile terminal exits the second operation mode, where the third instruction message is used to instruct the application server to temporarily store the second token.

Optionally, in this embodiment of the present disclosure, that the second token is temporarily stored includes temporarily storing at least one fourth notification message related to the second token. After a fourth instruction message is received, the temporarily stored at least one fourth notification message is sent to the push server, where the fourth instruction message is used to instruct to activate the second token.

Certainly, herein an operation of temporarily storing the second token is completed by the application server.

Figure 6:
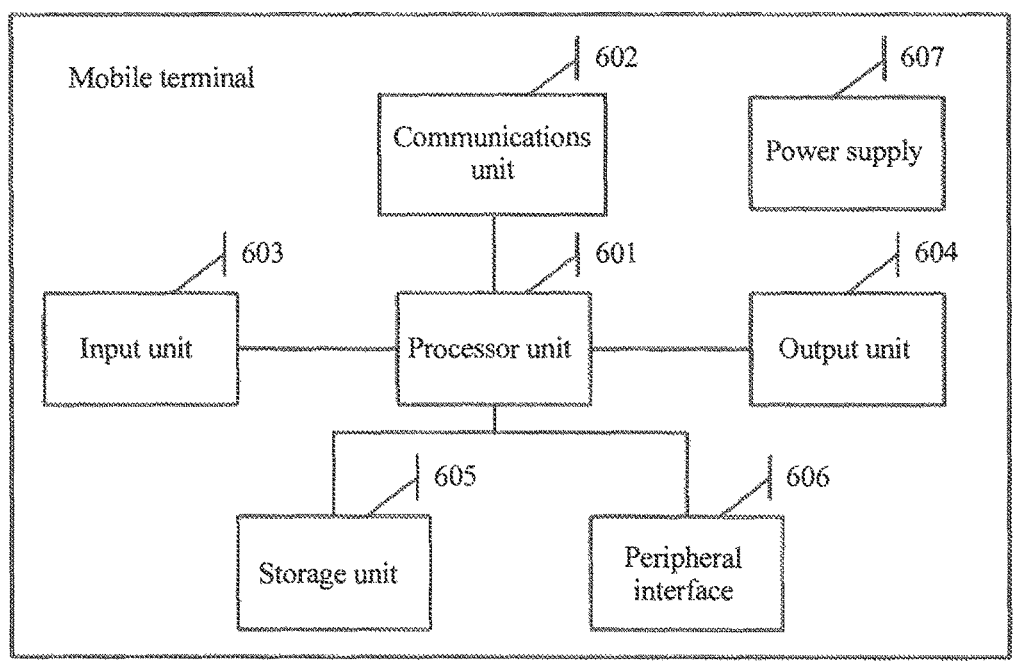
FIG. 6 is a detailed schematic structural diagram of a mobile terminal according to an embodiment of the present disclosure.

Referring to FIG. 6, FIG. 6 is a specific schematic diagram of a mobile terminal according to an embodiment of the present disclosure. The mobile terminal includes modules such as a processor unit 601, a communications unit 602, an input unit 603, an output unit 604, a storage unit 605, a peripheral interface 606, and a power supply 607. The modules except the power supply 607 are stored in the storage unit 605 in a form of software code, and may be executed by the processor unit 601.

The input unit 603 is configured to implement interaction between a user and the mobile terminal and/or enter external information into the mobile terminal.

The processor unit 601 is a control center of the mobile terminal, connects all parts of the entire mobile terminal by using various interfaces and lines, and executes various functions of the mobile terminal and/or data processing by running or executing a software program and/or a module that are/is stored in the storage unit 605 and by invoking data stored in the storage unit 605.

The communications unit 602 is configured to establish a communication channel, so that the mobile terminal is connected to a communication peer end by using the communication channel and exchanges data with the communication peer end by using the communication channel. The communications unit 605 may include wireless communications modules, such as a wireless local area network (WLAN) module, a Bluetooth module, Near Field Communication (NFC), and a baseband module, and wired communications modules, such as Ethernet, a Universal Serial Bus (USB), and a lightning interface (Lightning). The communications unit 602 is configured by all components in the mobile terminal to communicate with the communication peer end, and can support direct memory access (DMA).

The output unit 604 may include but is not limited to an image output unit, sound output, and a touch output unit.

The storage unit 605 may be configured to store a software program and a module, and the processor unit 601 executes various functional applications of the mobile terminal and implements data processing by running the software program and the module that are stored in the storage unit 605.

The power supply 607 is configured to supply power to different parts of the mobile terminal to maintain running of the parts.

In this embodiment, the communications unit 602 is responsible for communication and interaction between the mobile terminal and a server. The input unit 603 is configured to receive a network access notification message, a query message, or the like that is returned from a server side. The output unit 604 is configured to present prompt or interaction information on the mobile terminal to a user. The storage unit 605 is configured to receive a binding relationship in the query message returned by the server, and locally store the binding relationship. In this embodiment, the processor unit 601 is a core, and a function of the unit is specifically described in FIG. 7.

Figure 7:
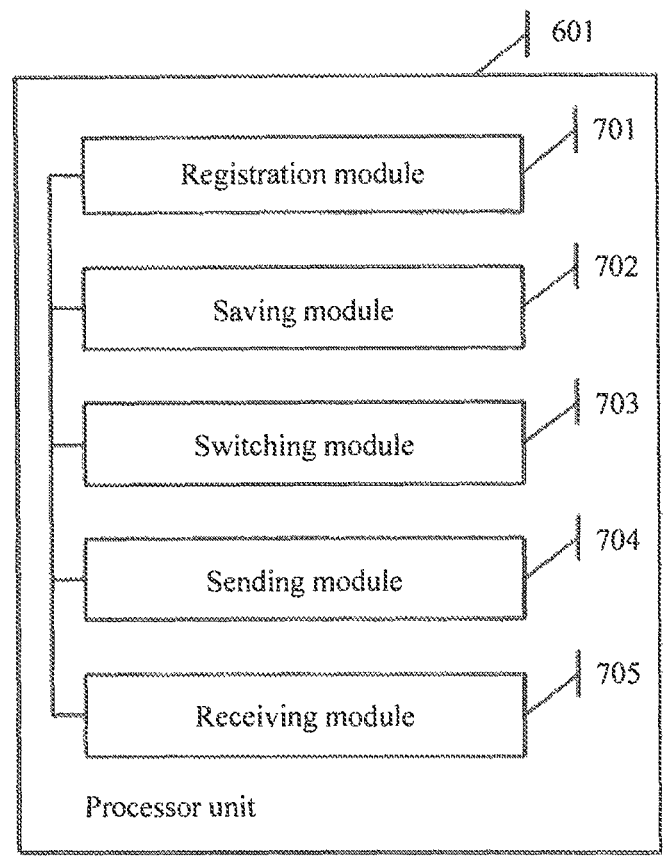
FIG. 7 is a schematic structural diagram of a processor unit in a mobile terminal according to an embodiment of the present disclosure.

FIG. 7 is a schematic structural diagram of the processor unit 601. The processor unit 601 includes a registration module 701, a saving module 702, a switching module 703, a sending module 704, and a receiving module 705.

The registration module 701 is responsible for responding to an operation that is performed when the mobile terminal registers a push notification the first time, and for registering a notification message pushing service with a push server.

The saving module 702 is configured to save tokens of the mobile terminal in different modes and store the tokens in the storage unit 605.

The switching module 703 is configured to receive a mode switching instruction in the mobile terminal and switch the mobile terminal to a corresponding operation mode.

The sending module 704 is configured to send to the push server, when the mobile terminal successfully switches to another mode, a message of suspending/activating a token.

The receiving module 705 is configured to receive a notification message sent by the push server and display the notification message by using the output unit 604.

The processor unit 601 and the processor unit 501 may be a same functional unit, the communications unit 602 and the communications unit 502 may be a same functional unit, the input unit 603 and the input unit 503 may be a same functional unit, and the output unit 604 and the output unit 504 may be a same functional unit.

Figure 8:
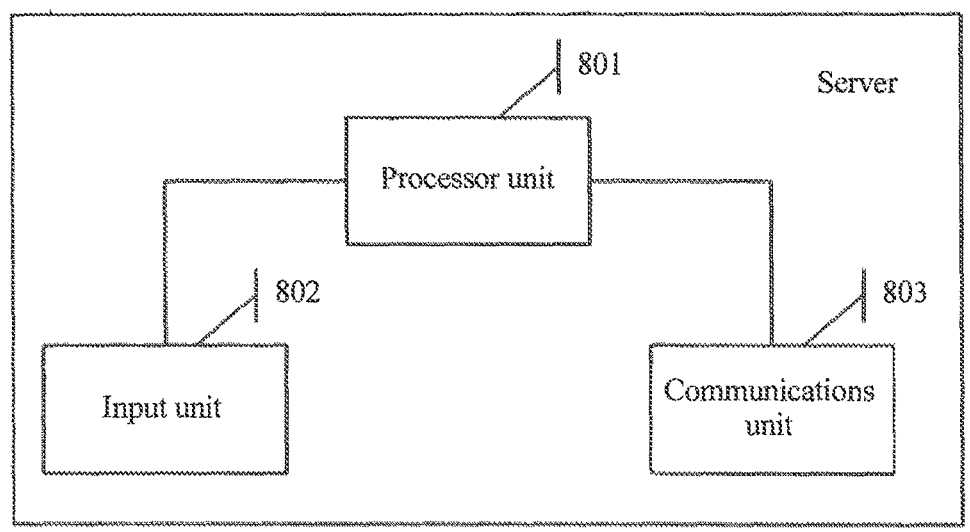
FIG. 8 is a main schematic structural diagram of a server according to an embodiment of the present disclosure.

Referring to FIG. 8, based on a same inventive concept, an embodiment of the present disclosure provides a server. The server includes an input unit 802 and a communications unit 803 that are connected to a same processor unit 801.

The communications unit 803 is configured to establish a second communication channel with a mobile terminal.

The input unit 802 is configured to receive, by using the second communication channel, a first instruction message sent by the mobile terminal. The first instruction message is used to instruct the server to temporarily store at least one second notification message related to a first token and the first token is a first identification that is of the mobile terminal in the first operation mode and that is used for a push service.

The processor unit 801 is configured to temporarily store the at least one second notification message according to the first instruction message.

Optionally, in this embodiment of the present disclosure, the server further includes an output unit, which is connected to the processor unit 801 configured to send, before the input unit 802 receives by using the second communication channel the first instruction message sent by the mobile terminal, at least one first notification message related to the first token to the mobile terminal by using the second communication channel.

Optionally, in this embodiment of the present disclosure, if the server is a push server, the input unit 802 is further configured to receive by using the second communication channel, before the output unit sends the at least one first notification message related to the first token to the mobile terminal by using the second communication channel, a first registration request sent by the mobile terminal, where the first registration request is used to request the push server to generate the first token, and the first token is used for the push service of the mobile terminal in the first operation mode, where the mobile terminal has at least the first operation mode and a second operation mode. The processor unit 801 is further configured to generate the first token according to the first registration request, and send the first token to the mobile terminal by using the output unit and by using the second communication channel.

Optionally, in this embodiment of the present disclosure, the input unit 802 is further configured to receive, after the input unit 802 receives by using the second communication channel the first instruction message sent by the mobile terminal, a second registration request sent by the mobile terminal, where the second registration request is used to request the push server to generate a second token, and the second token is used for a push service of the mobile terminal in the second operation mode. The processor unit 801 is further configured to generate the second token according to the second registration request, and send the second token to the mobile terminal by using the output unit and by using the second communication channel.

Optionally, in this embodiment of the present disclosure, the output unit is further configured to send, after sending the second token to the mobile terminal by using the second communication channel, at least one third notification message related to the second token to the mobile terminal by using the second communication channel, where the second token is a second identification that is of the mobile terminal in the second operation mode and that is used for the push service.

Optionally, in this embodiment of the present disclosure, the input unit 802 is further configured to receive, after the output unit sends the second token to the mobile terminal by using the second communication channel, by using the second communication channel a second instruction message sent by the mobile terminal, where the second instruction message is used to instruct the push server to destroy the second token and to activate the first token. The processor unit 801 is further configured to destroy the second token and activate the first token, according to the second instruction message.

Optionally, in this embodiment of the present disclosure, the output unit is further configured to send, by using the second communication channel, the temporarily stored at least one second notification message to the mobile terminal after the processor unit 801 destroys the second token and activates the first token, according to the second instruction message.

Optionally, in this embodiment of the present disclosure, the input unit 802 is further configured to receive, after the output unit sends the second token to the mobile terminal by using the second communication channel, by using the second communication channel, a third instruction message sent by the mobile terminal, where the third instruction message is used to instruct the push server to temporarily store the second token and to activate the first token. The processor unit 801 is further configured to temporarily store the second token and activate the first token, according to the third instruction message.

Optionally, in this embodiment of the present disclosure, that the processor unit 801 is further configured to temporarily store the second token includes temporarily storing at least one fourth notification message related to the second token. After a fourth instruction message is received, sending the temporarily stored at least one fourth notification message to the mobile terminal by using the output unit and by using the second communication channel, where the fourth instruction message is sent by the mobile terminal, and the fourth instruction message is used to instruct to activate the second token.

Optionally, in this embodiment of the present disclosure, the output unit is further configured to send, by using the second communication channel, the temporarily stored at least one second notification message to the mobile terminal after the processor unit 801 temporarily stores the second token and activates the first token, according to the third instruction message.

Optionally, in this embodiment of the present disclosure, if the server is an application server, the input unit 802 is further configured to receive, after receiving by using the second communication channel the first instruction message sent by the mobile terminal, by using the second communication channel a second token sent by the mobile terminal, where the second token is a second identification that is of the mobile terminal in the second operation mode and that is used for a push service.

Optionally, in this embodiment of the present disclosure, the output unit is further configured to send, after the second token sent by the mobile terminal is received by using the second communication channel, at least one third notification message related to the second token to a push server by using the second communication channel.

Optionally, in this embodiment of the present disclosure, the input unit 802 is further configured to receive, after receiving by using the second communication channel the second token sent by the mobile terminal, by using the second communication channel a second instruction message sent by the mobile terminal, where the second instruction message is used to instruct the push server to destroy the second token and to activate the first token. The processor unit 801 is further configured to destroy the second token and activate the first token, according to the second instruction message.

Optionally, in this embodiment of the present disclosure, the output unit is further configured to send, by using the second communication channel, the temporarily stored at least one second notification message to the push server after the processor unit 801 destroys the second token and activates the first token, according to the second instruction message.

Optionally, in this embodiment of the present disclosure, the input unit 802 is further configured to receive, after receiving by using the second communication channel the second token sent by the mobile terminal, by using the second communication channel, a third instruction message sent by the mobile terminal, where the third instruction message is used to instruct the application server to temporarily store the second token and to activate the first token. The processor unit 801 is further configured to temporarily store the second token and activate the first token, according to the third instruction message.

Optionally, in this embodiment of the present disclosure, that the processor unit 801 is further configured to temporarily store the second token includes temporarily storing at least one fourth notification message related to the second token. When a fourth instruction message is received by using the input unit, sending the temporarily stored at least one fourth notification message to the push server by using the output unit and by using the second communication channel, where the fourth instruction message is used to instruct to activate the second token.

Optionally, in this embodiment of the present disclosure, the output unit is further configured to send, by using the second communication channel, the temporarily stored at least one second notification message to the push server after the processor unit 801 temporarily stores the second token and activates the first token, according to the third instruction message.

Figure 9:
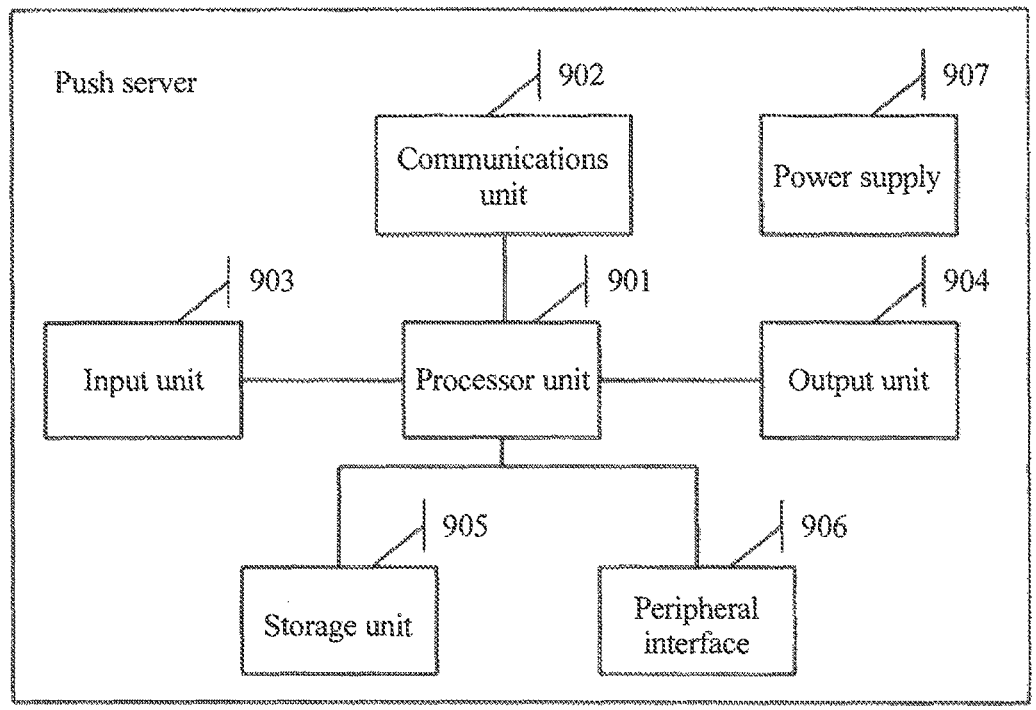
FIG. 9 is a detailed schematic structural diagram of a push server according to an embodiment of the present disclosure.

Referring to FIG. 9, FIG. 9 is a possible schematic structural diagram of a push server according to an embodiment of the present disclosure. The push server includes modules such as a processor unit 901, a communications unit 902, an input unit 903, an output unit 904, a storage unit 905, a peripheral interface 906, and a power supply 907. The modules except the power supply 907 are stored in the storage unit 905 in a form of software code, and may be executed by the processor unit 901.

The input unit 903 is configured to implement interaction between a user and the push server and/or enter external information into the push server.

The processor unit 901 is a control center of the push server, connects all parts of the entire push server by using various interfaces and lines, and executes various functions of the push server and/or data processing by running or executing a software program and/or a module that are/is stored in the storage unit 905 and by invoking data stored in the storage unit 905.

The communications unit 902 is configured to establish a communication channel, so that the push server is connected to a communication peer end by using the communication channel and exchanges data with the communication peer end by using the communication channel. The communications unit 905 may include wireless communications modules, such as a wireless local area network module, a Bluetooth module, NFC, and a baseband module, and wired communications modules, such as Ethernet, a USB, and a lightning interface. The communications unit 602 is configured by all components in the push server to communicate with the communication peer end, and can support DMA.

The output unit 904 may include but is not limited to an image output unit, sound output, and a touch output unit.

The storage unit 905 may be configured to store a software program and a module, and the processor unit 901 executes various functional applications of the push server and implements data processing by running the software program and the module that are stored in the storage unit 905.

The power supply 907 is configured to supply power to different parts of the push server to maintain running of the parts.

In this embodiment, the communications unit 902 is responsible for communication and interaction between the push server and a mobile terminal. The input unit 903 is configured to receive a network access request message, a query message, or the like that is returned from a mobile terminal side. The output unit 904 is configured to present interaction information on the push server. The storage unit 905 is configured to: receive information sent by the mobile terminal, and locally store the information. In this embodiment, the processor unit 901 is a core, and a function of the unit is specifically described in FIG. 10.

Figure 10:
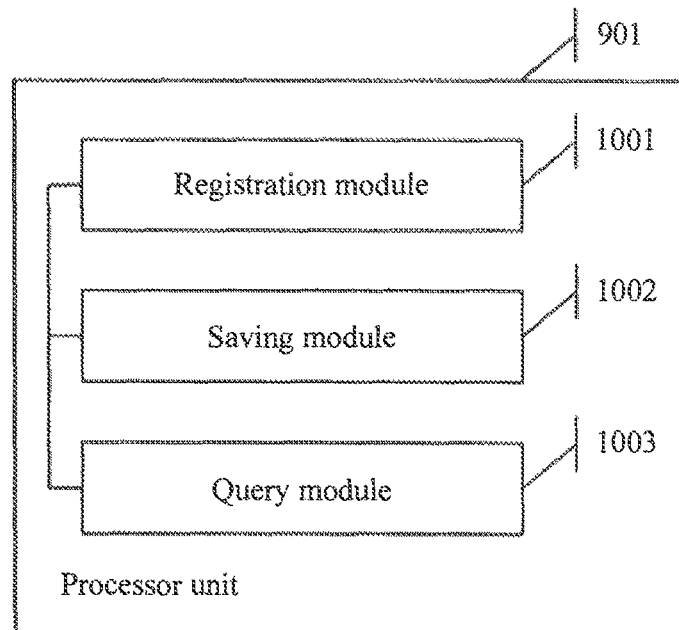
FIG. 10 is a schematic structural diagram of a processor unit in a push server according to an embodiment of the present disclosure.

FIG. 10 is a schematic structural diagram of the processor unit 901 of the push server. The processor unit 901 includes a registration module 1001, a saving module 1002, and a query module 1003.

The registration module 1001 is responsible for responding to a notification pushing service application of the mobile terminal, that is, responsible for responding to a registration request, and for generating a corresponding token according to information about the mobile terminal and issuing the token to the mobile terminal that applies.

The saving module 1002 is configured to save information, such as suspending/activating a token, sent when the mobile terminal switches between operation modes, and temporarily store a notification message related to a suspended token.

The query module 1003 is configured to query a suspended/an activated state of the token.

The processor unit 801 and the processor unit 901 may be a same functional unit, the communications unit 803 and the communications unit 902 may be a same functional unit, the input unit 802 and the input unit 903 may be a same functional unit, and the output unit and the output unit 904 may be a same functional unit.

The embodiments of the present disclosure provide an information sending method that is executed by a mobile terminal. The mobile terminal has at least a first operation mode and a second operation mode, the first operation mode is different from the second operation mode. The method includes receiving, when the mobile terminal is in the first operation mode, at least one first notification message that is related to a first token and sent by a push server, where the first token is a first identification that is of the mobile terminal in the first operation mode and that is used for a push service; sending a first instruction message to the push server when the mobile terminal switches from the first operation mode to the second operation mode, where the first instruction message is used to instruct the push server to temporarily store at least one second notification message related to the first token; and receiving at least one third notification message that is related to a second token and sent by the push server, where the second token is a second identification that is of the mobile terminal in the second operation mode and that is used for a push service.

In this embodiment of the present disclosure, when the mobile terminal is in the first operation mode, the push server sends a notification message related to the first token, that is, sends the at least one first notification message, to the mobile terminal. If the mobile terminal switches to the second operation mode, and the push server may still receive a notification message that is related to the first token and referred to as the at least one second notification message herein, the mobile terminal instructs the push server to stop sending the at least one second notification message. In addition, the mobile terminal may further apply for the second token that is in the second operation mode, so as to receive, in the second operation mode, a notification message related to the second token, that is, receive the at least one third notification message. In this way, when being in different operation modes, the mobile terminal may be corresponding to different tokens, so that the mobile terminal can receive different notification messages according to the different operation modes. It may be learned that after the technical solutions in the embodiments of the present disclosure are used, for messages in different operation modes, a suppressing effect between the different operation modes is relatively good. For example, if the first operation mode is an owner mode, and the second operation mode is a guest mode, in the second operation mode, the mobile terminal no longer receives a notification message related to the first operation mode, which avoids disclosure of user privacy to the greatest extent, improves information security, and also improves system reliability.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed.

In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely used to describe the technical solutions in this application. The foregoing embodiments are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

What is claimed is:

1. An information sending method executed by a mobile terminal, comprising:
    receiving, from a push server, at least one first notification message related to a first token when the mobile terminal is in a first operation mode, the first token being a first identifier of the mobile terminal while in the first operation mode and being used for a push service in the first operation mode;
    sending a first instruction message to the push server when the mobile terminal switches from the first operation mode to a second operation mode, the first operation mode being different from the second operation mode, and the first instruction message being used to instruct the push server to temporarily store at least one second notification message related to the first token; and
    receiving, from the push server, at least one third notification message related to a second token, the second token being a second identifier of the mobile terminal while in the second operation mode and being used for a push service in the second operation mode.

2. The method according to claim 1, wherein before receiving the at least one first notification message from the push server, the method further comprises:
- sending a first registration request to the push server, the first registration request being used to request the first token from the push server, and the first token being used for the push service of the mobile terminal in the first operation mode; and
- receiving the first token from the push server.

3. The method according to claim 1, wherein after sending the first instruction message to the push server, the method further comprises:
- sending a second registration request to the push server, the second registration request being used to request the second token from the push server, and the second token being used for the push service of the mobile terminal in the second operation mode;
- receiving the second token from the push server; and
- sending the second token to an application server, the second token comprising instructions to send the at least one third notification message to the push server.

4. The method according to claim 3, wherein after receiving the second token from the push server, the method further comprises destroying the second token when the mobile terminal exits the second operation mode.

5. The method according to claim 3, wherein after receiving and saving the second token from the push server, the method further comprises sending a second instruction message to the push server when the mobile terminal exits the second operation mode, the second instruction message comprising instructions to destroy the second token.

6. The method according to claim 1, wherein after receiving the second token from the push server, the method further comprises sending a third instruction message to the push server when the mobile terminal exits the second operation mode, the third instruction message comprising instructions to temporarily store the second token.

7. An information processing method, executed by a server, comprising:
- sending at least one first notification message related to a first token to a mobile terminal, the at least one first notification message being sent while the mobile terminal is in a first operation mode, and the first token being a first identifier of the mobile terminal while in the first operation mode;
- receiving a first instruction message from the mobile terminal when the mobile terminal switches to a second operation mode, the first instruction message being used to instruct the push server to temporarily store at least one second notification message related to the first token, and the first token being used for a push service of the mobile terminal while in the first operation mode; and
- sending at least one third notification message related to a second token to the mobile terminal, the second token being a second identifier of the mobile terminal while in the second operation mode and being used for a push service of the mobile terminal while in the second operation mode, and the second token being different than the first token.

8. The method according to claim 7, wherein before sending the at least one first notification message related to the first token to the mobile terminal, the method further comprises:
- receiving a first registration request from the mobile terminal, the first registration request being used to request the first token from the push server, and the mobile terminal having at least the first operation mode and the second operation mode;
- generating the first token according to the first registration request; and
- sending the first token to the mobile terminal.

9. The method according to claim 8, wherein after receiving the first instruction message from the mobile terminal, the method further comprises:
- receiving a second registration request from the mobile terminal, the second registration request being used to request the second token from the push server, and the second token being used for a push service of the mobile terminal while in the second operation mode;
- generating the second token according to the second registration request; and
- sending the second token to the mobile terminal.

10. The method according to claim 9, wherein after sending the second token to the mobile terminal, the method further comprising:
- receiving a second instruction message from the mobile terminal, the second instruction message being used to instruct the push server to destroy the second token and to activate the first token; and
- destroying the second token and activating the first token responsive to the second instruction message.

11. The method according to claim 9, wherein after sending the second token to the mobile terminal, the method further comprises:
- receiving a third instruction message from the mobile terminal, the third instruction message being used to instruct the push server to temporarily store the second token and to activate the first token; and
- temporarily storing the second token and activating the first token, according to the third instruction message.

12. The method according to claim 7, further comprising temporarily storing the at least one second notification message according to the first instruction message.

13. A mobile terminal, having at least a first operation mode and a second operation mode, comprising:
- a processor;
- a communications device coupled to the processor, the communications device being configured to establish a first communication channel with a push server;
- an input device coupled to the processor, the input device being configured to receive from the push server, with the first communication channel, at least one first notification message related to a first token while the mobile terminal is in the first operation mode, and the first token being a first identifier of the mobile terminal in the first operation mode and being used for a push service in the first operation mode; and
- an output device coupled to the processor and configured to send, with the first communication channel, a first instruction message to the push server when the mobile terminal switches from the first operation mode to a second operation mode, the first operation mode being different than the second operation mode, the first instruction message being used to instruct the push server to temporarily store at least one second notification message related to the first token, and
- the input device being further configured to receive from the push server, with the first communication channel, at least one third notification message related to a second token, the second token being a second identifier of the mobile terminal in the second operation mode and being used for a push service in the second operation mode.

14. The mobile terminal according to claim 13, wherein the output device is further configured to send, with the first communication channel, a first registration request to the push server before the input device receives the at least one first notification message related to the first token, the first registration request being used to request the first token from the push server, the first token being used for the push service of the mobile terminal in the first operation mode, and the input device being further configured to receive, with the first communication channel, the first token from the push server.

15. The mobile terminal according to claim 13, wherein the output device is further configured to send a second registration request to the push server with the first communication channel after sending the first instruction message to the push server with the first communication channel, the second registration request being used to request the second token from the push server, the second token being used for the push service of the mobile terminal in the second operation mode, the input device being further configured to receive, with the first communication channel, the second token from the push server, the output device being further configured to send the second token to an application server with the first communication channel, and the second token comprising instructions to send the at least one third notification message to the push server according to the second token.

16. The mobile terminal according to claim 15, wherein the input device is configured to destroy the second token when the mobile terminal exits the second operation mode after the input device receives the second token from the push server.

17. The mobile terminal according to claim 15, wherein the output device is further configured to send, with the first communication channel, a second instruction message to the push server when the mobile terminal exits the second operation mode after the input device receives the second token from the push server, and the second instruction message being used to instruct the push server to destroy the second token.

18. The mobile terminal according to claim 13, wherein the output device is further configured to send, with the first communication channel, a third instruction message to the push server when the mobile terminal exits the second operation mode after the input device receives the second token from the push server, and the third instruction message being used to instruct the push server to temporarily store the second token.

\* \* \* \* \*